(No Model.) 12 Sheets—Sheet 1.

J. PATTEN.
LASTING MACHINE.

No. 452,316. Patented May 12, 1891.

Witnesses
Geo. Wadman
C. R. Ferguson

Inventor
John Patten
By his attorney
Edwin H. Brown

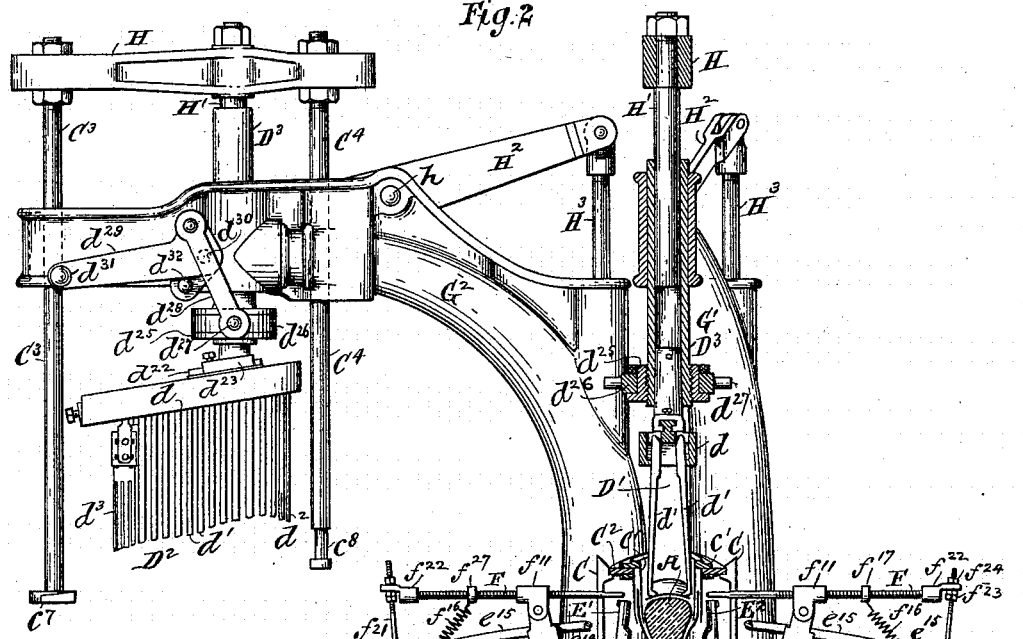

(No Model.) 12 Sheets—Sheet 3.

J. PATTEN.
LASTING MACHINE.

No. 452,316. Patented May 12, 1891.

Witnesses
Geo Wadman
C. R. Ferguson

Inventor
John Patten
By his attorney
Edwin H. Brown

THE NORRIS PETERS CO., PHOTO-LITHO., WASHINGTON, D. C.

(No Model.)
12 Sheets—Sheet 6.

J. PATTEN.
LASTING MACHINE.

No. 452,316. Patented May 12, 1891.

Witnesses
Geo. Wadman
O. R. Ingram

Inventor
John Patten
By his attorney
Edwin H. Brown (No Model.) 12 Sheets—Sheet 7.
J. PATTEN.
LASTING MACHINE.
No. 452,316. Patented May 12, 1891.
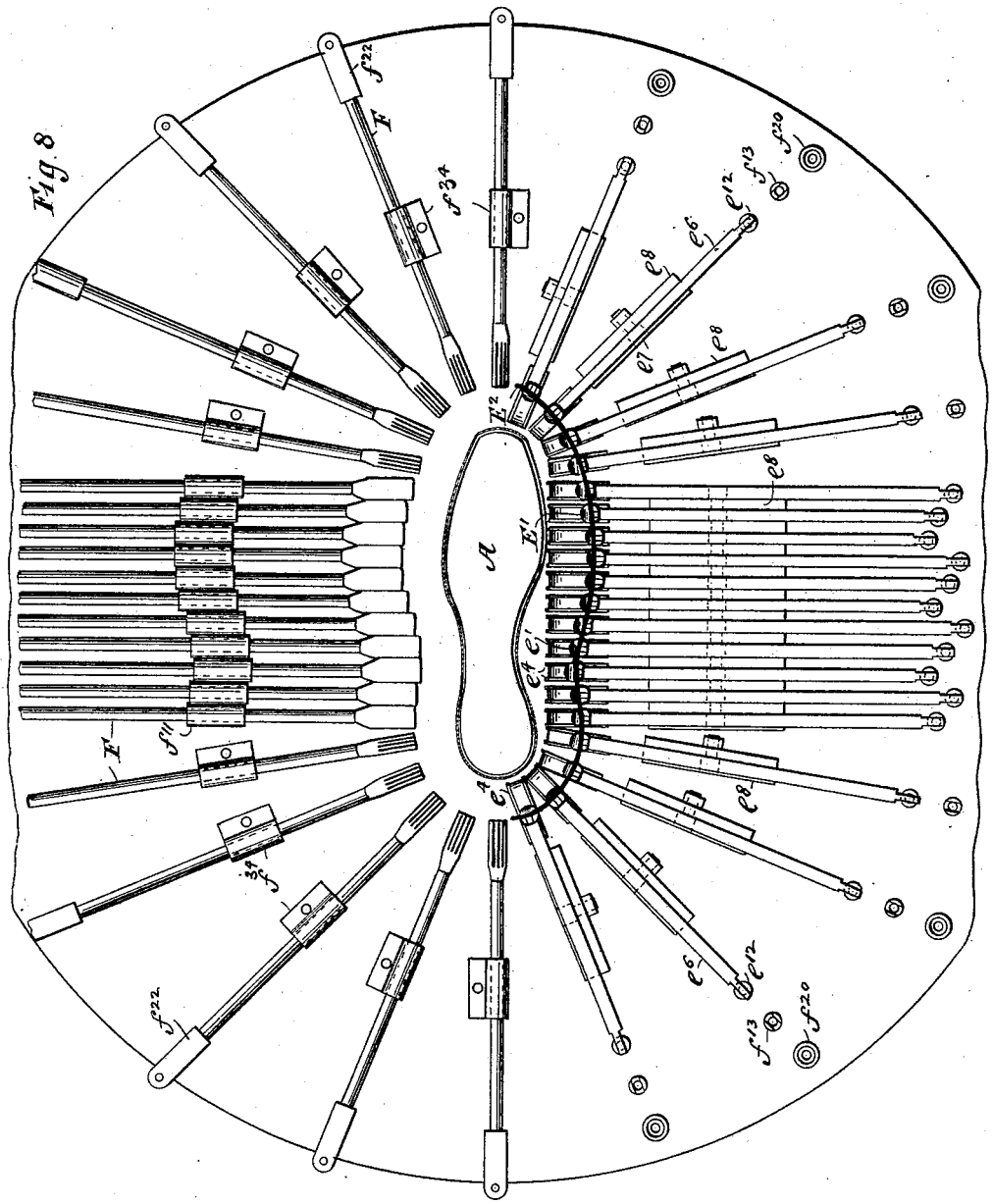

(No Model.) 12 Sheets—Sheet 8.
J. PATTEN.
LASTING MACHINE.
No. 452,316. Patented May 12, 1891.
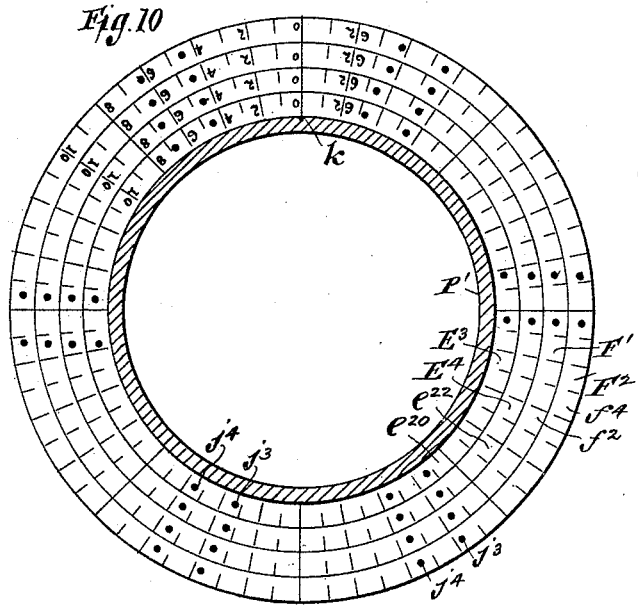
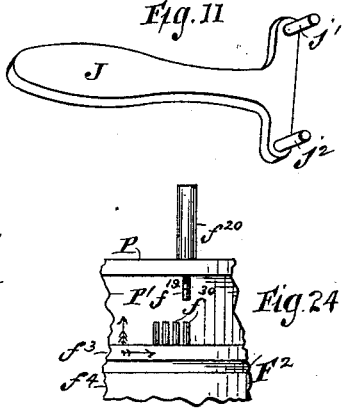
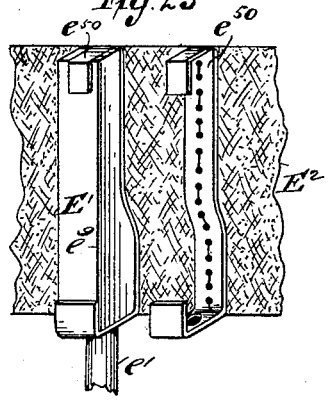
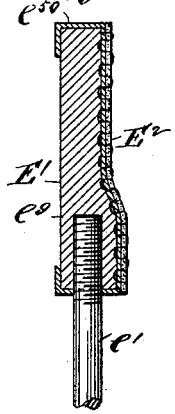
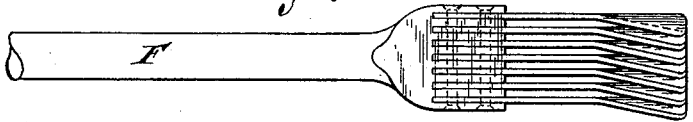
Witnesses
Geo. Wadman
C. R. Ingram
Inventor
John Patten
By his attorney
Edwin H. Brown
THE NORRIS PETERS CO., PHOTO-LITHO., WASHINGTON, D. C.

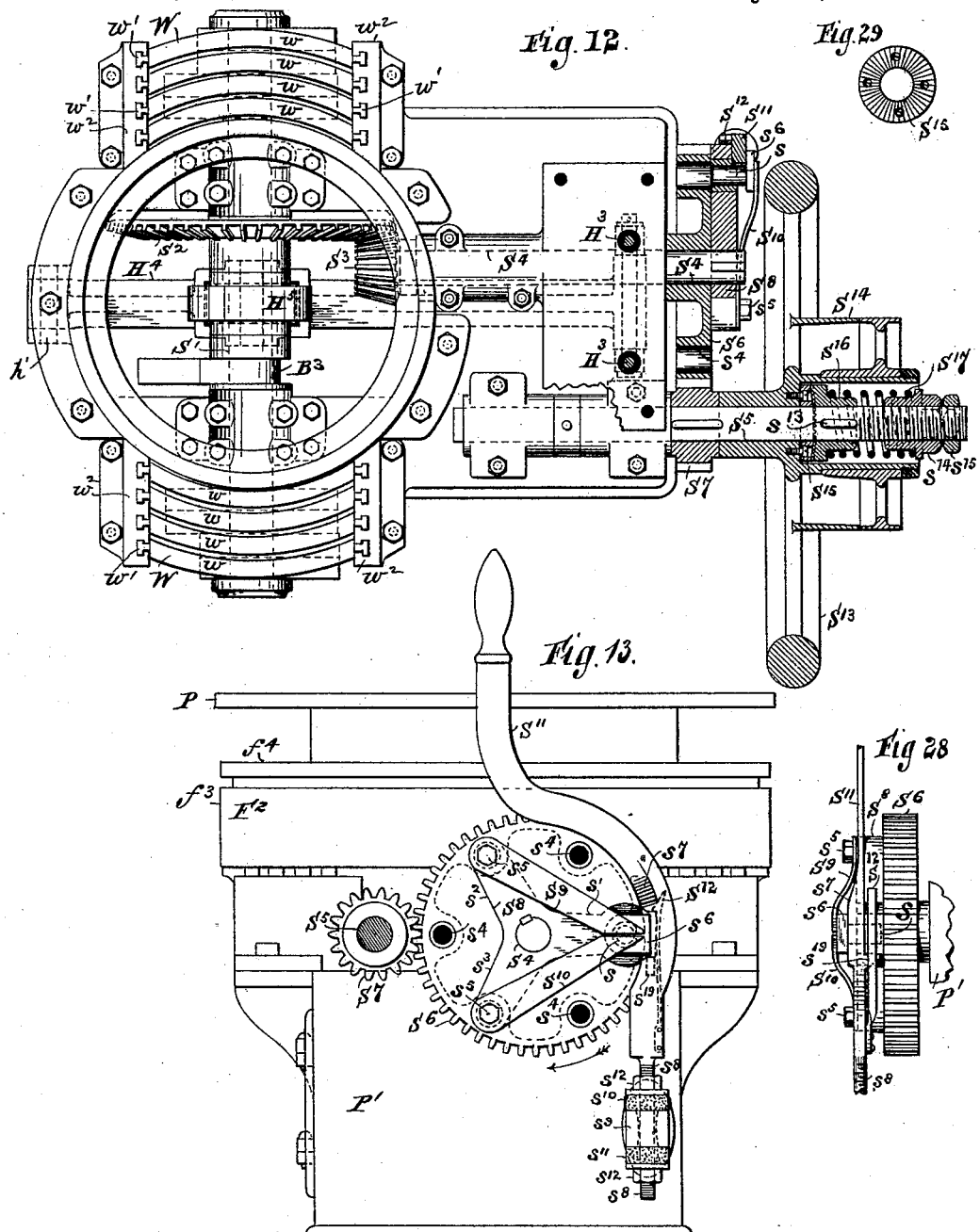
(No Model.) 12 Sheets—Sheet 9.
J. PATTEN.
LASTING MACHINE.
No. 452,316. Patented May 12, 1891.

(No Model.) 12 Sheets—Sheet 10.
J. PATTEN.
LASTING MACHINE.
No. 452,316. Patented May 12, 1891.
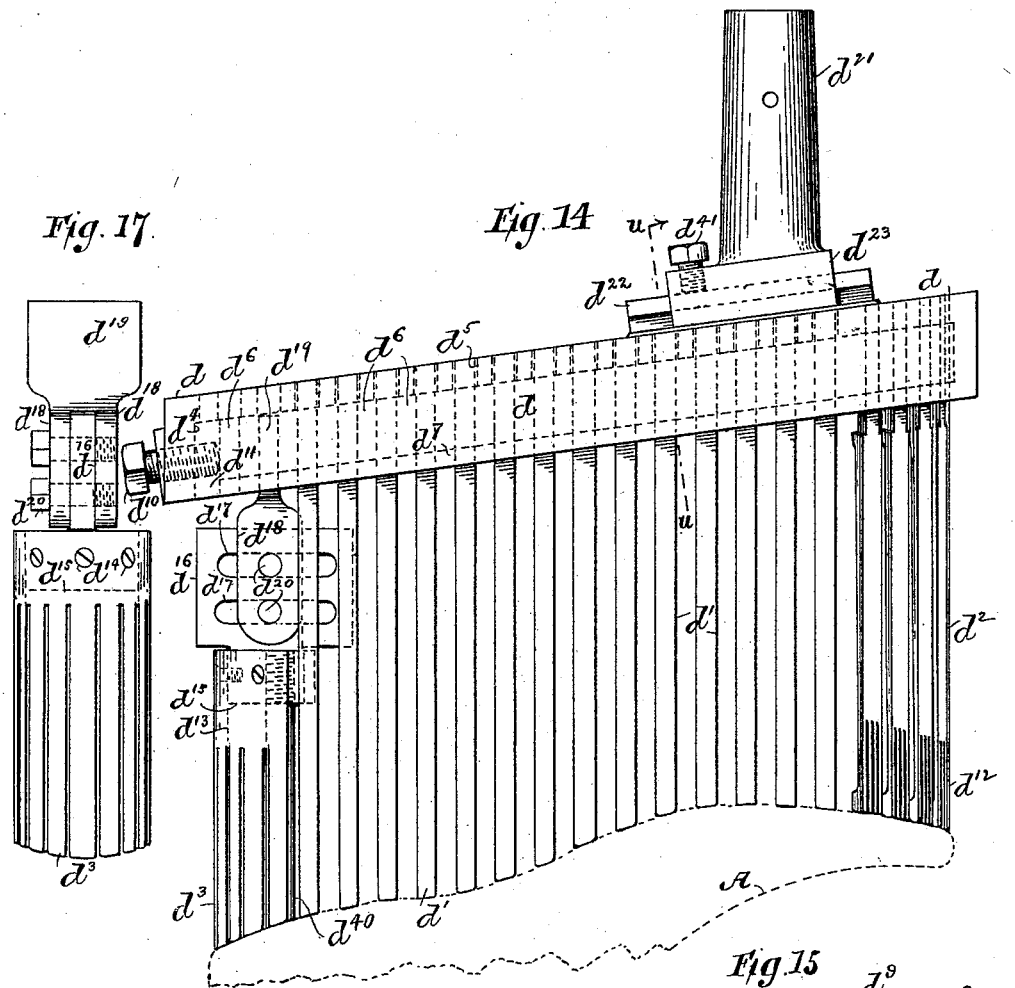
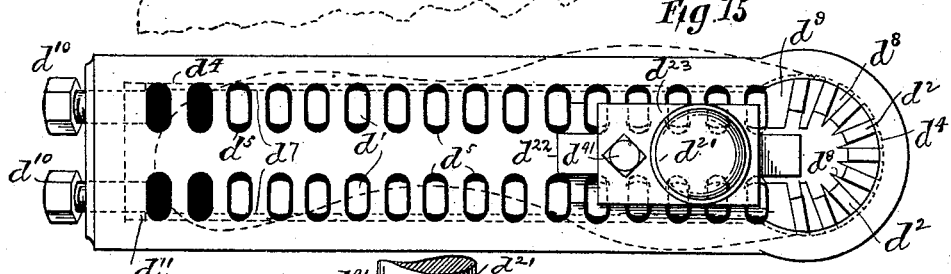
Witnesses
Geo. Wadman
C. A. Ferguson
Inventor
John Patten
By his attorney
Edwin H. Brown (No Model.) 12 Sheets—Sheet 11.

J. PATTEN.
LASTING MACHINE.

No. 452,316. Patented May 12, 1891.

(No Model.) 12 Sheets—Sheet 12.
J. PATTEN.
LASTING MACHINE.
No. 452,316. Patented May 12, 1891.
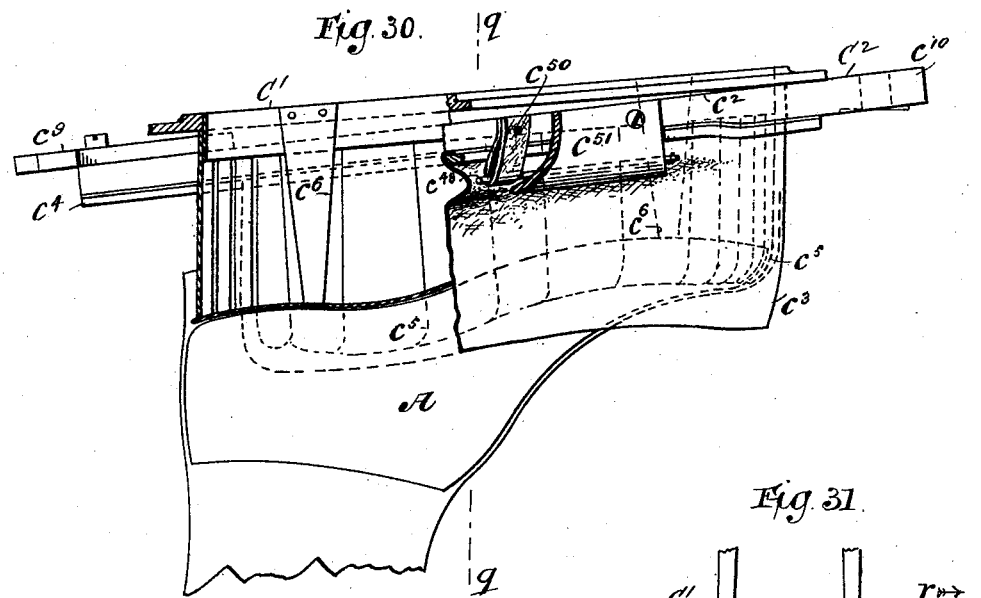
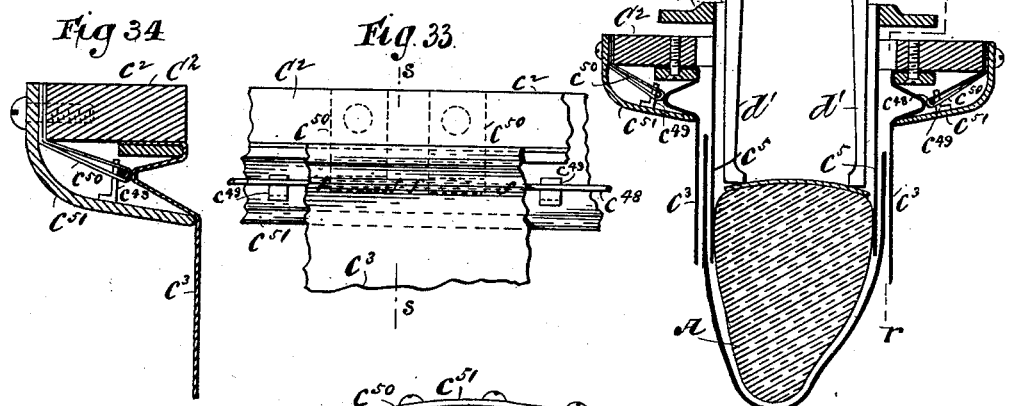
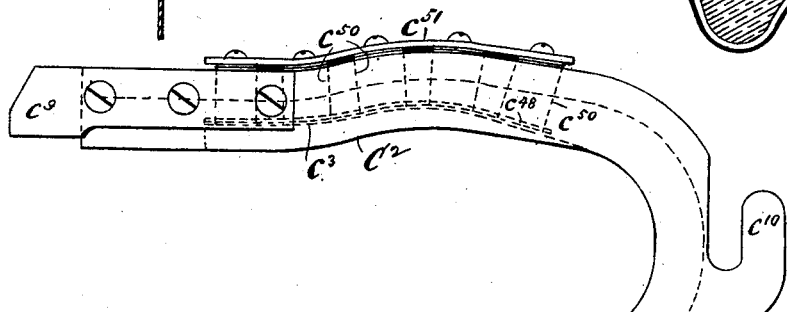
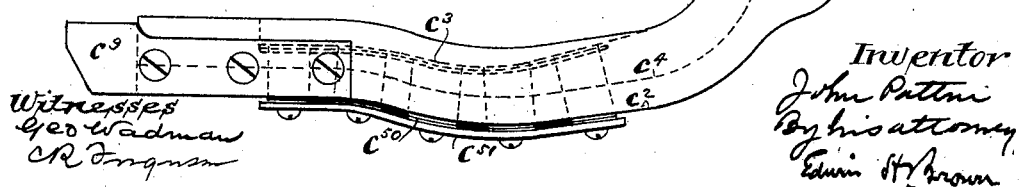
Witnesses
Geo Wadman
C R Ferguson
Inventor
John Patten
By his attorney
Edwin H. Brown

UNITED STATES PATENT OFFICE.

JOHN PATTEN, OF NEW YORK, N. Y., ASSIGNOR TO THE UNIVERSAL LASTING MACHINE COMPANY, OF SAME PLACE.

LASTING-MACHINE.

SPECIFICATION forming part of Letters Patent No. 452,316, dated May 12, 1891.

Application filed June 28, 1890. Serial No. 357,080. (No model.)

*To all whom it may concern:*

Be it known that I, JOHN PATTEN, a citizen of the United States, and a resident of New York, in the county of New York and State of New York, have invented a certain new and useful Improvement in Lasting-Machines, of which the following is a specification.

I will describe a machine embodying my improvement, and then point out the novel features in the claims.

Figure 1:
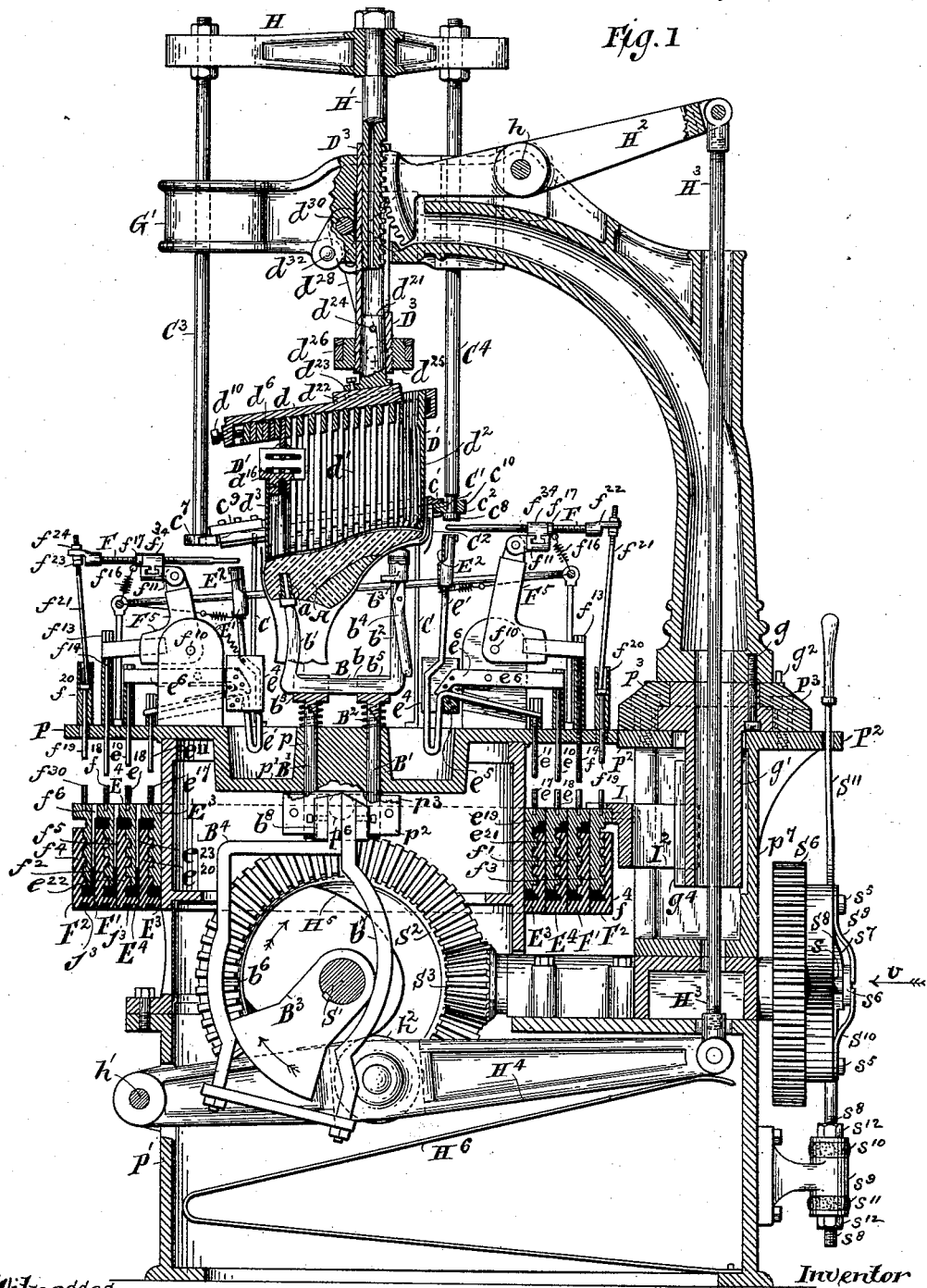
Figure 4:
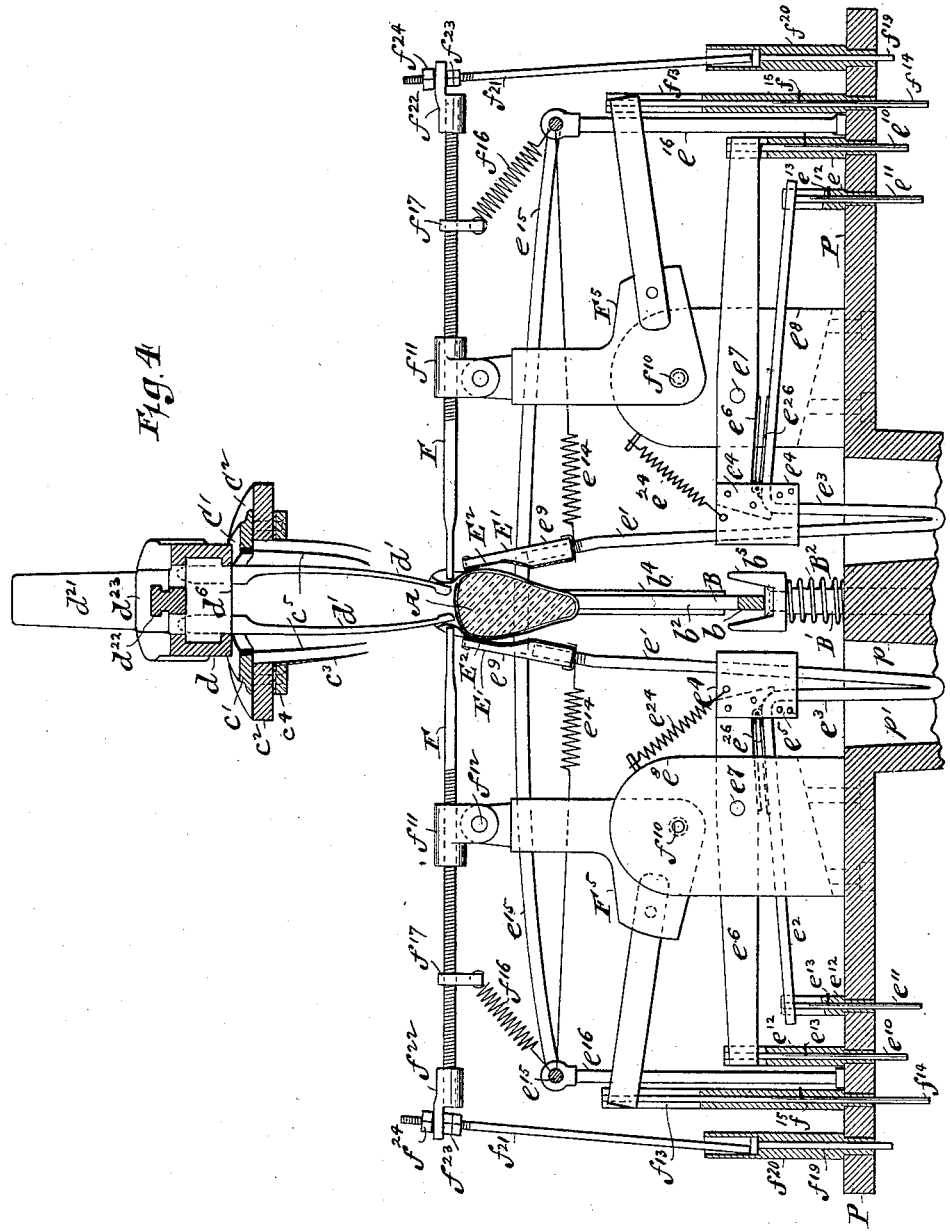
Figure 5:
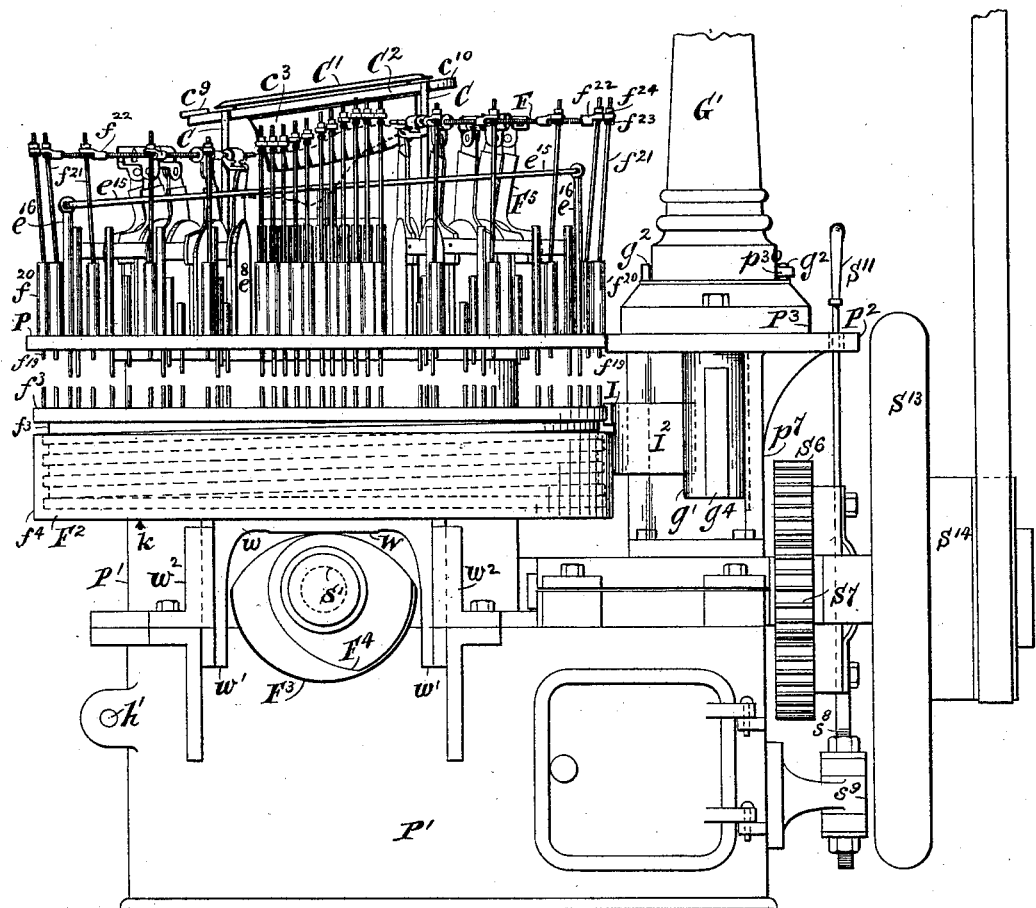
Figure 6:
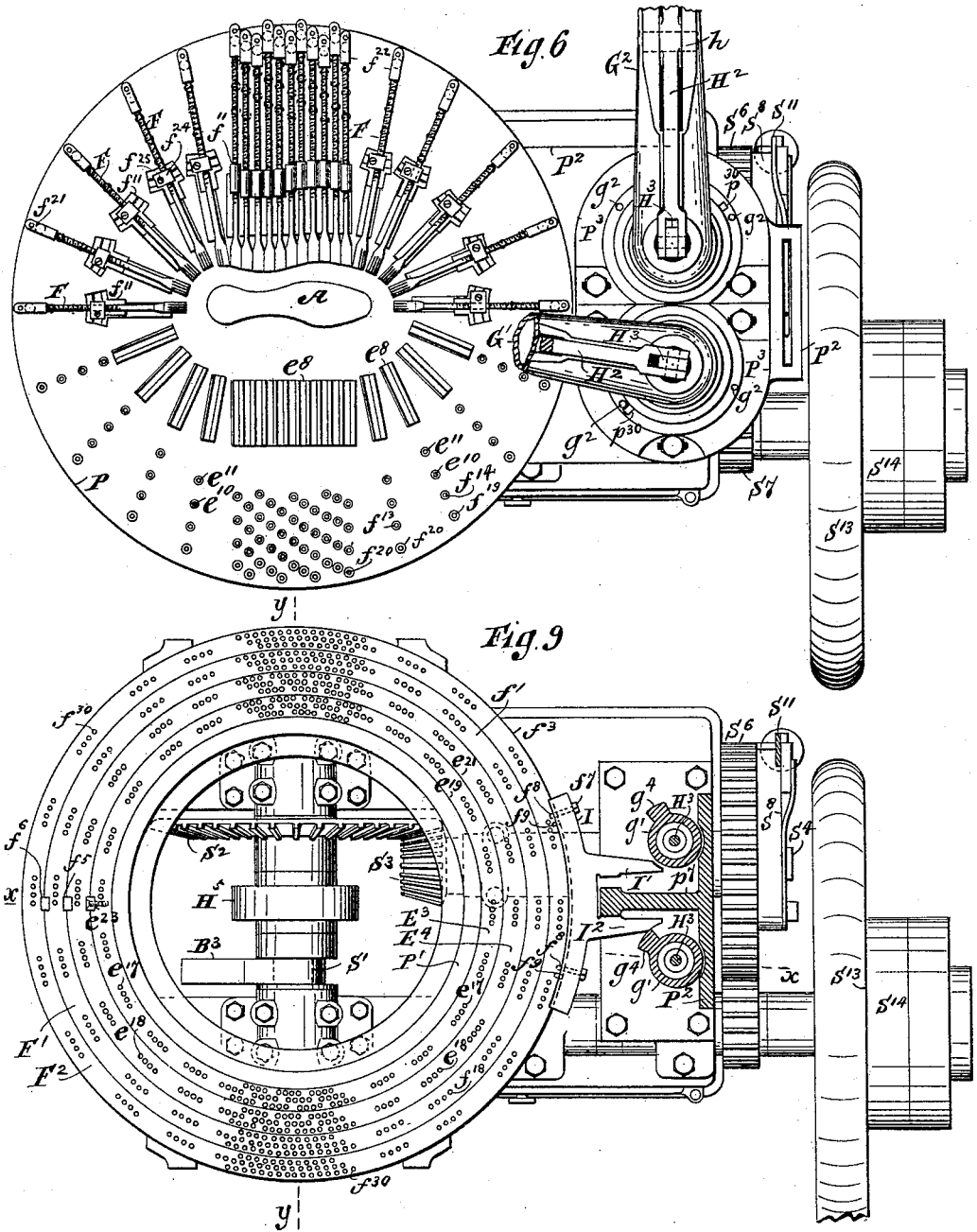
Figure 7:
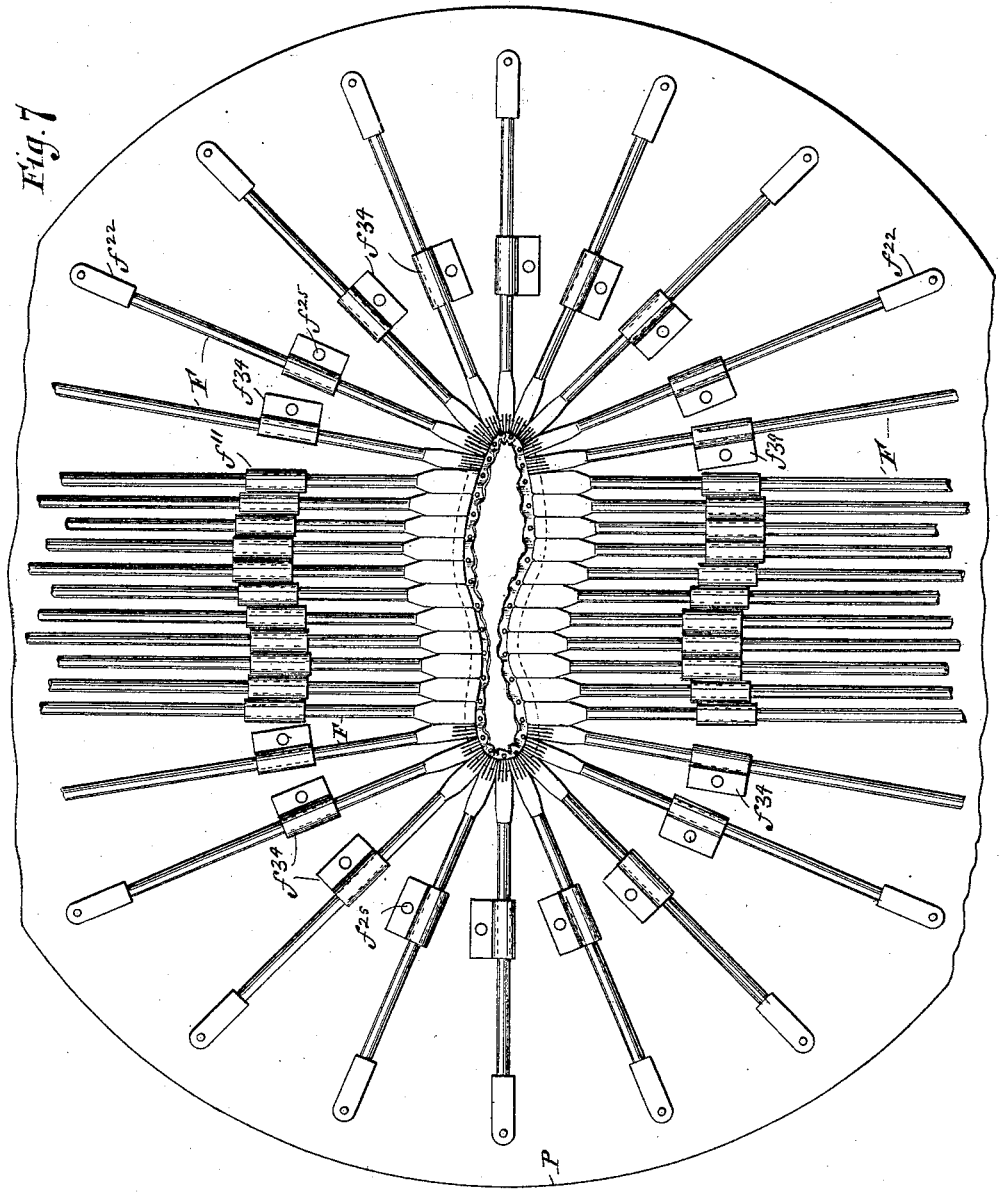
Figure 18:
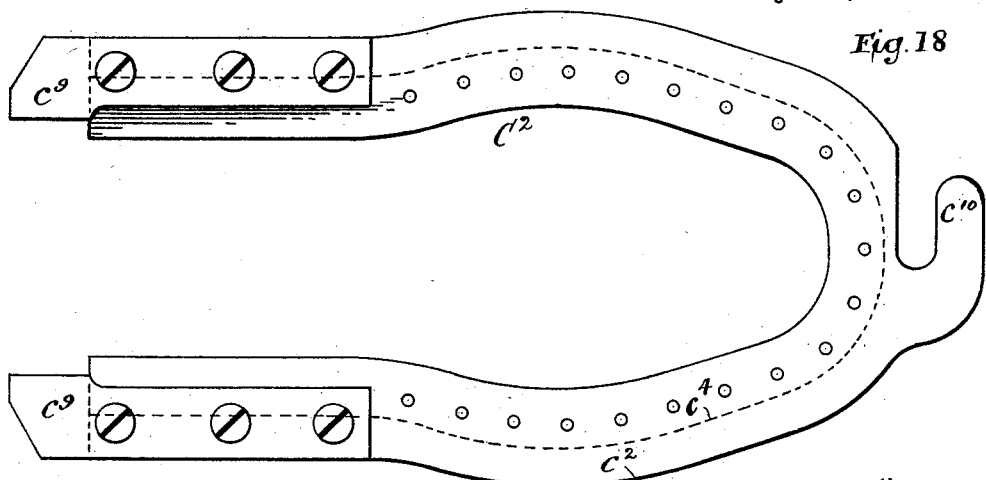
Figure 19:
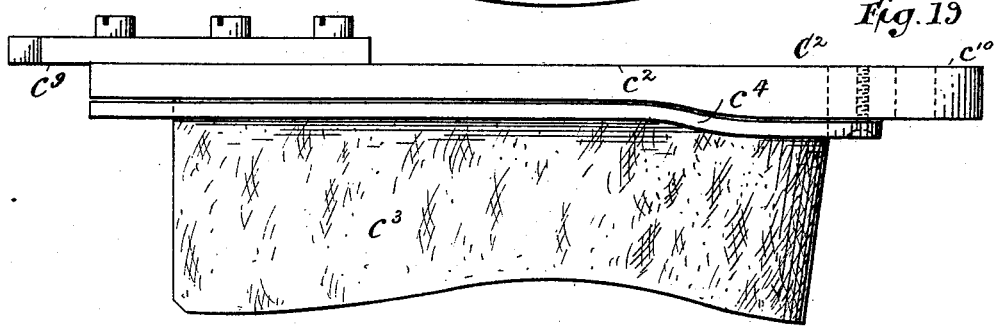
Figure 21:
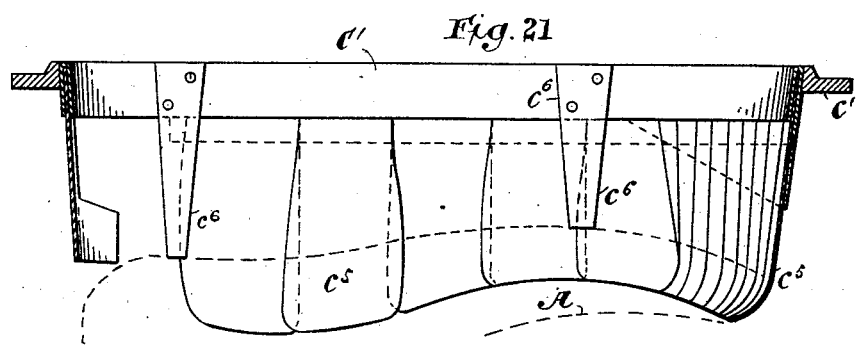
Figure 20:
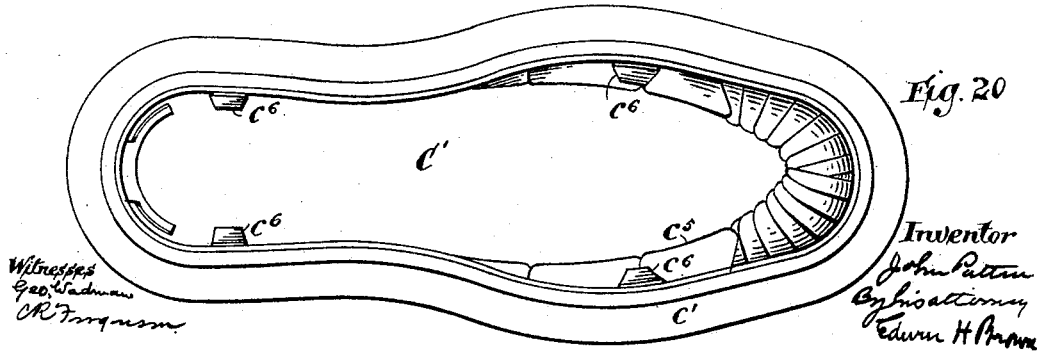

In the accompanying drawings, Figure 1 is a vertical section of a lasting-machine embodying my improvement, the section being taken as indicated by the dotted line x x, Fig. 9. Fig. 2 is a vertical section taken substantially in a plane at right angles to the principal plane of Fig. 1, as indicated by the dotted line y y, Fig. 9. Fig. 3 is an inverted plan of certain parts toward which the arrow t in Fig. 2 points. Fig. 4 is a vertical section corresponding to Fig. 2; but it is made on a larger scale and does not show all the parts which are included in Fig. 2. Certain parts which it shows and which are also illustrated by Fig. 2 are shown in different positions. Fig. 5 is a side view of the machine, excepting only that certain of the upper parts have been omitted. Fig. 6 is a top view of the principal parts of the machine, but certain parts of the machine are represented as broken away and other parts are entirely omitted in this figure. Fig. 7 is a top view of certain parts which are also represented in Fig. 6, but in Fig. 7 these parts are illustrated upon a much larger scale and are represented as occupying different positions. Fig. 8 is a top view of some of the parts which are illustrated in Fig. 7 and certain other parts which do not appear in this figure. Here the parts which are also shown in Fig. 7 are represented in different positions. Fig. 9 is a horizontal section taken at the plane of the dotted line z z, Fig. 2, looking downward. Fig. 10 is an inverted plan of certain rings whose upper surfaces are illustrated in Fig. 9. Fig. 11 is a perspective view of an arm whereby the rings just mentioned may be rotated. Fig. 12 is a horizontal section taken at the plane of the dotted line w w, Fig. 2, looking downward. Fig. 13 is an end view of a portion of the machine, looking in the direction indicated by the arrow v, Fig. 1. Fig. 14 is a side view, on an enlarged scale, of a device termed a "downhold" and which is employed to hold the last down during a certain part of the operation of lasting. This view also represents a portion of a last in dotted outline. Fig. 15 is a top view of the downhold and includes a representation in dotted outline of a last. Fig. 16 is a section taken at the plane of the dotted line u u, Fig. 14, looking in a direction indicated by the arrow marked at the end of the line. Fig. 17 is a view of certain parts which are used at the heel portion of the downhold. Fig. 18 is a top view of the outer section of a device termed a "stretcher," whereby the leather forming the upper of the shoe is drawn and stretched over the last. Fig. 19 is a side view of the outer section of the stretcher. Fig. 20 is a top view of the inner section of the stretcher. Fig. 21 is a longitudinal section of the inner section of the stretcher. It also includes in dotted outline a representation of the sole portion of a last. Fig. 22 is an enlarged vertical section of the upper extremity of one of a number of pressing and holding fingers. Fig. 23 is a perspective view of the outer side of the upper extremity of one of a number of pressing and holding fingers and a band secured thereto and a tip belonging to another pressing and holding finger and which is secured to the band. Fig. 24 is a side view of a part of the base portion of a machine-frame and of the bed-piece, also of a portion of one of a number of rings provided with pins which are used in the machine. This view also shows a pin connected with the bed-piece to be operated by any one of the pins which are represented as attached to the ring. Fig. 25 is a top view of the ring represented in Fig. 4 and of a number of other similar rings. This view also includes a horizontal section of part of the base portion of the machine-frame. Fig. 26 is an enlarged top view of one of a number of crimping-fingers. Fig. 27 is an end view of this crimping-finger. Fig. 28 is a side elevation of a detent which is employed for bringing the machine to rest, and in this view an arm which coacts with the detent is also represented. Fig. 29 is a face view of one of two parts by which motion is transmitted from a driving-pulley to the machine proper. Fig. 30 is a sectional elevation illustrating a modified construction of a stretcher which is comprised in the machine. Fig. 31 is a vertical section taken at the line $q\ q$, Fig. 30. Fig. 32 is a top view of an outer section of the stretcher. Fig. 33 is a vertical section taken as indicated by the line $r\ r$, Fig. 31, looking in the direction indicated by the arrow which is marked at one end of the line. Fig. 34 is a vertical section taken at the plane of the dotted line $s\ s$, Fig. 33.

Similar letters of reference designate corresponding parts in all the figures.

Preliminarily to a detailed description of this machine, I will explain its salient features, thinking thereby to conduce to a ready understanding of the new improvements.

A designates a last.

B designates a jack or holder for the last. It will be seen that the last occupies an inverted position in the machine.

$D'\ D^2$ designate two downholds. These downholds are alike, excepting only that one is intended for use with a left last and the other with a right last. Of course only one is used with any last. When either is used, it is brought into a position above the last to hold the last against any upward movement at a certain stage in the operation of lasting. Each downhold comprises a number of resilient fingers which are normally separated at some little distance from each other, but which may be crowded together and bent inward.

$C'\ C^2$ designate a stretcher. Two such devices will be used and they will differ merely in that one will be adapted for a left and the other for a right last. The function of this device is to draw and stretch the leather forming the upper tightly around the last.

$E'$ designates a number of pressing and holding fingers, which are designed to hold the upper firmly against the last after the upper shall have been drawn and strained around the last.

$E^2$ designates a holding-band, which is intermediate of the pressing and holding fingers and the last and which is pressed against the upper by these fingers.

F designates crimping-fingers, which move inward to force the edge of the upper over the sole portion of the last.

I will now explain the operation of the parts which I have just described. The last A, after having an upper arranged upon it, is placed on the holder or jack B. The upper is then stretched forward and while it is held central the lever-cam $b^4$ is operated so as to force the clamp $b^3$ upward. Thus the holder or jack, which is U-shaped, springs and clamps the upper between the clamp $b^3$ and the last, holding it central. After this is done the inner section $C'$ of the stretcher is placed on the last, so that its depending portion or envelope will extend between the last and the upper-leather. The outer section $C^2$ of the stretcher having been previously placed on its supports in its proper place in the machine, the jack, last, upper, and stretching section $C'$ are lowered through it into the machine while properly connected. The insole is then dropped through the inner stretcher $C'$. It will be understood that after the two sections of the stretcher shall have been placed in position the edge of the upper will extend between them. The downhold now is lowered. It forces the last down to its proper position and serves to hold the insole firmly upon the last. In this way the last will be forced down to its proper position and the insole will be held fast upon it. Next the pressing and holding fingers are set in motion. In the initial movement they are elevated or lowered, if this be necessary, to bring them into proper vertical position to enable them to operate upon the particular last which is in the machine, and afterward they are oscillated in such manner as that their upper end portions and the band $E^2$ will be forced inward to tightly and firmly hold the upper and stretcher-sections together and the inner stretcher-section against the last.

The succeeding step in the operation consists in the elevation of the two sections of the stretchers. As the edge portion of the upper is at the time tightly gripped and held between the two sections of the stretcher it will be drawn upwardly and stretched tightly around the last. Now the crimping-fingers operate. First they move longitudinally until they reach the edge portion of the upper and press it against the fingers of the downhold. Then they are oscillated so as to lower their inner ends properly to enable them to press the edge of the upper portion tightly around the edge portion of the insole, which is laid upon the last. This inward movement of the crimpers is continued and results in pressing the fingers of the downhold together and crowding or crimping the edge portion of the upper tightly over the insole which is upon the last. It must be understood that the upper is held all this time by the pressing and holding fingers $E'$ and holding-band $E^2$. The downhold is raised and moved out of the way. It leaves the crimpers holding the edge portion of the upper down upon the insole which was laid upon the last. The edge portion of the upper is then tacked to the insole in any suitable manner, preferably with a tacking-tool. The tacks are clinched underneath the insole by coming in contact with a metal facing-plate arranged upon the sole portion of the last. I have not deemed it necessary to represent this metal facing-plate, because it is customary to provide lasts with such a plate. The operation of lasting having thus been completed, the crimpers F and the pressing and holding fingers $E'$, together with the band $E^2$, are moved away from the last, whereupon the latter, with the jack or holder B, may be removed from the machine.

Having now, as I think, prepared the mind to readily understand the details of the machine, I will proceed with a description of them. The jack or holder B is substantially of U form, having a body $b$ and two substantially parallel arms $b'$ $b^2$. The arm $b'$ is inserted in the metal socket $a$ with which the heel portion of the last is provided, and the arm $b^2$ bears against the portion of the upper which fits around the toe portion of the last. The arm $b^2$ is telescoped at the end $b^3$, which is faced with leather to bear against the upper, and which may be forced lengthwise of the main section of the arm $b^2$ by means of a lever $b^4$ for the purpose of canting the last, so that it will be firmly held upon the arm $b'$. The last is of course fitted to the jack or holder after being fitted with the upper. When the last and the jack or holder B are introduced into the machine, the body portion $b$ of the jack or holder rests in seats $b^5$, which are formed on or attached to the upper extremities of vertically-sliding rods B'. These seats preferably have flaring sides, as may be understood from reference to Fig. 2, to facilitate the fitting of the jack or holder into them. The rods B' pass through vertical holes in a hub-like portion $p$, with which the bed-piece P is provided. Springs B$^2$ surround the rods B' between the bottoms of their seats $b^5$ and the top of the bed-piece P. They sustain the rods in the position which they are to normally occupy, but allow them to yield vertically to afford provision for adjusting the last into the proper vertical position.

Around the hub-like portion $p$ of the bed-piece is an annular cavity $p'$. Beneath this cavity is a plate $p^2$, which may be seen best in Figs. 2 and 3. It is formed integral with the bed-piece, and has in one face semicircular cavities which communicate with the holes of the hub-like portion $p$, through which the rods B' pass. Opposite this plate $p^2$ is a plate $p^3$, which has similar semicircular cavities and which is capable of movement toward and from the plate $p^2$ to enable it in conjunction with the latter to clamp or release the rods B'.

At the time of the insertion of the last with the jack or holder B the rods B' are unclamped and are supported solely by the springs B$^2$. After the adjustment of the last to the proper position the rods will, as a part of the operation of the machine, be clamped tightly in place to hold the last in such position. I will now explain how this clamping is done. The plate $p^3$ is provided with a female screw-thread. As here shown, this is done by attaching a nut $p^4$ to the plate. This nut, it will be seen upon reference to Figs. 2 and 3, is arranged at one side of the plate and provided with a collar or neck which enters a cavity formed in the outer side of the plate, and a set-screw $p^5$ is employed to secure the collar or neck of the nut in the plate and so that it will be incapable of rotation. A rock-shaft $p^6$ passes through the plates $p^2$ $p^3$ and also through the nut $p^4$. This shaft is supported solely by the plate $p^2$. It is screw-threaded and engaged with the nut $p^4$. At the end which protrudes from the plate $p^2$ the shaft $p^6$ has a projection or head which bears on the outer side of this plate and precludes the shaft from any longitudinal movement toward the plate $p^3$. Obviously a movement of the screw in one direction will cause it to draw the plate $p^3$ toward the plate $p^2$ and forcibly clamp the rods B' between these plates. It will be readily understood that a reverse rotary movement of the shaft $p^6$ will by its coaction with the nut $p^4$ move the plate $p^3$ away from the plate $p^2$, so as to release the rods B'. The shaft $p^6$ is oscillated by means of a cam B$^3$, affixed to a shaft S', which is journaled in the base portion P' of the machine. This cam B$^3$ rotates within a frame B$^4$, which is rigidly affixed to the head of the shaft $p^6$, and has arc-shaped portions $b^6$ $b^7$, against which operates a peripheral segment of the cam made concentric with the shaft S'. While this peripheral segment of the cam is traveling along either of the arc-shaped portions $b^6$ $b^7$ of the frame B$^4$ it maintains the lever in position. It imparts motion to the lever only while passing from one of the arc-shaped portions of the frame to the other. The frame B$^4$, as here shown, is made of two bent rods, which at one end bear against each other and fit between jaws or cheeks $b^8$, which are formed integral with or rigidly secured to the head of the rock-shaft. Set-screws passing through these jaws or cheeks and impinging against the portions of the rods which are embraced by them fasten the latter securely in place. At the other ends these shafts are united by a cross-piece.

I will now further describe the stretcher C' C$^2$. Its construction may be best understood by reference to Figs. 18, 19, 20, and 21. The outer section C$^2$ consists of a metal plate $c^2$ and a depending flexible envelope $c^3$. The plate $c^2$ conforms in general shape to the outline of the sole portion of a last. It may have the peculiarities of a right or left last, as two stretchers will preferably be used. It is longer than any last used in the machine and is open at the portion which corresponds to the heel of the last.

The envelope preferably consists of a strip of stout leather fastened at the upper edge to the plate and extending downwardly therefrom. Like the plate, this strip is open at the end corresponding to the heel portion of a last. A convenient way of attaching the envelope to the plate $c^2$ is to bend its edge outwardly against the under side of the plate and to place a smaller plate $c^4$ beneath the outwardly-turned portion of the envelope and to force it by screws or otherwise toward the main plate $c^2$ for the purpose of clamping the interposed portion of the envelope to the plate $c^2$. Standards C, fastened to the bed-piece, serve to support the outer stretcher-section. As here shown, the upper extremities of these standards are enlarged and notched on the inner side to form seats for the outer edge portion of the plate $c^2$. The section C', which is best illustrated in Figs. 20 and 21, comprises a plate $c'$, which is constructed of a size and shape to lap over the plate $c^2$ of the outer section $C^2$ of the stretcher. The outer section of the stretcher is in this way enabled to engage with the inner section. It will be seen that the plate $c'$ is continuous, or, in other words, endless, instead of being open at the heel portion. It has neither the peculiarities of a right or left last, but is constructed so that it may operate in conjunction with a last of either kind. From the plate $c'$ of the inner stretcher-section an envelope $c^5$ extends. This preferably consists of a number of leaves of sheet metal fastened at the upper extremity to the plate $c'$. These leaves lap over each other and form a continuous envelope which fits between the edge portion of the upper and the last. This inner stretcher-section is provided with legs $c^6$, which will prevent its descending too low upon the last. These are shown as consisting of metal strips which are fastened to the plate $c'$ and extend downwardly at such points that they may rest upon the last. Preferably the inner stretcher-section will be placed upon the last before the introduction of the last with its jack or holder into the machine, and all these parts will be passed through the opening in the plate of the outer stretcher-section in introducing them into the machine. The inner stretcher-section may be supported by the contact of its legs $c^6$ with the insole on the sole portion of the last.

I have already explained that the stretcher-sections are drawn upward at a certain stage in the operation of the machine. The means for elevating them consist of rods $C^3$ $C^4$, fitted to slide vertically in bent arms or goose-necks. There are two of these arms or goose-necks, because there are two downholds. They are marked G' G². Each has rods $C^3$ $C^4$ combined with it. As both these arms or goose-necks and their appurtenances are alike, it will be sufficient to describe but one. The base of each goose-neck is fitted to a plate P², which is shown as arranged in the same plane with the top portion of the bed-piece, and may be regarded as in effect a portion of the bed-piece. The goose-neck is so connected with this plate as to be free to rotate. As here shown, the connection is made by providing the base portion of the goose-neck with a circumferential groove and fastening to the plate P² a plate P³, having at the upper edge an inwardly-extended circular flange which enters a groove of the goose-neck. As here shown, the goose-neck is provided with a groove by making it in two sections arranged one below the other and fastened together by screws $g$. The lower section has a sleeve $g'$, which extends down below the plate P². The purpose of this sleeve will be explained hereinafter. The plate P² is shown as formed integral with a frame $p^7$, which is supported by the base portion of the machine-frame. The rod $C^3$ is provided at the lower extremity with a cross-plate $c^7$, and the rod $C^4$ is provided at its lower end with a button $c^8$. Normally these rods occupy such relation to the goose-neck G' that when this goose-neck is swung around to a position over the stretcher C' C² the cross-plate $c^7$ of the rod $C^3$ will swing under lugs $c^9$, with which the plate $c^2$ of the outer stretcher-section is provided, and the button $c^8$ of the rod $C^4$ will swing into engagement with a hook $c^{10}$, which extends from the toe portion of the said plate $c^2$. After this the rods $C^3$ $C^4$ are elevated, and as they ascend they draw up the stretcher, and thereby effect the drawing and stretching of the upper around the last.

The means here shown for elevating the rods $C^3$ $C^4$ consist of a yoke H, to which they are fastened at the upper ends and which in turn is secured to a vertically-movable rod H', that slides vertically through the goose-neck G'. On this rod H' a toothed rack is provided, and with this rack a toothed segment-lever H² engages. This segment-lever is fulcrumed between its ends by a pin $h$ to the goose-neck. The outer end of the lever is pivotally connected to a rod H³, that extends downwardly through the goose-neck and at the lower extremity is pivotally connected with one arm of a lever H⁴. The lever H⁴ is fulcrumed at one end by a pin $h'$ to the base portion of the machine-frame. Intermediately of its ends it is acted upon by a cam H⁵, that is affixed to the shaft H'. I have shown the lever as provided with an anti-friction bowl or wheel $h^2$ at the point where it derives motion from the cam. The cam H⁵, it will be seen, has two short concentric portions with intermediate eccentric curved portions. A spring H⁶ is employed to swing the lever upwardly. The particular form of spring represented is a grasshopper-spring. It is fastened at one end to the base portion of the machine-frame, while at the other end it bears against the free end of the lever H⁴. While that one of the two concentric portions which is described with the longer radius is operating upon the lever the lever will be maintained in its lowest position and the rods $C^3$ $C^4$ will be elevated, and while the concentric portion, which is described with the shorter radius, is operating upon the lever the lever will be maintained in its highest position, as represented in Fig. 1. Then the rods $C^3$ $C^4$ will be maintained in a position which will render them capable of engaging with the plate $c^2$ of the outer stretcher-section $C^2$. The shifting of the lever from one position to the other will be accomplished during the time that the eccentric surfaces of the cam are acting upon the lever. It will be obvious from this explanation that the lever dwells for a considerable time in each of its positions during the operation of the machine.

In Figs. 30, 31, 32, 33, and 34 I have shown that the plate $c'$ of the inner section C' of the stretcher normally rests upon the plate $c^2$ of the outer section C² only opposite the toe portion of the last, and that the opposite end portion of said plate $c'$ is supported by the legs $c^6$ in such position that it is elevated above the plate $c^2$ of the outer section. It is obvious that owing to this the plate $c^2$ of the outer section will at the beginning of each upward movement raise the toe portion of the plate $c'$ of the inner section of the stretcher, but will not raise the remainder of the plate $c'$ until after the said plate $c^2$ is raised some distance. The first pull of the envelope $c^5$ of the inner section will therefore be at the toe portion of the last. The importance of this I will explain presently. I have shown that the heel-plate of the envelope $c^5$ may be slitted vertically at the lower portion, if desired. I have shown in Figs. 30, 31, 32, 33, and 34 that the envelope $c^3$ of the outer section of the stretcher may be puckered, except at the toe portion. Springs $c^{50}$, which may consist of bands of rubber connected to the plate $c'$ at one end and at the other end to a wire $c^{48}$, which is fastened by stitching or otherwise to the envelope in a line parallel with the edge of said plate, may serve as a means for puckering the envelope. Outside the springs a plate $c^{51}$ is extended to cause that portion of the envelope that is below the puckered portion to be vertical. This puckering is gradual, beginning at a point near the toe portion and gradually increasing from there to the heel portion, and may be limited by stops $c^{49}$. Owing to this puckering, the initial movement of the outer section of the stretcher will cause the drawing of the upper over the toe portion of the last, but will not draw the remainder of the upper around the last until after the initial movement, because until the puckered portion of the envelope is straightened out that portion of the envelope can have no effect in drawing the upper around the last.

It is considered by manufacturers of shoes to be very advantageous to draw the upper over the toe of the last to a greater extent than at any other portion, and this is secured by the peculiar action which the stretcher, when modified as illustrated in Figs. 30, 31, 32, 33, and 34, will have, by reason of the fact that it will pull throughout its movement upon the toe portion of the upper and only throughout a portion of its movement upon the remainder of the upper.

I will now fully explain the downholds D' D². As each differs from the other merely in being for a different kind of last—as, for example, for a left last instead of a right last—it will be necessary to describe but one. Its construction is best illustrated by Figs. 1, 2, 4, 14, 15, 16, and 17. It consists of a number of fingers $d'$ $d^2$ $d^3$, which are secured to a holder or body-piece $d$. The fingers $d'$ $d^2$ are considerably thicker at the upper and lower extremity than throughout the middle portion, as may be readily understood by reference to Figs. 1 and 2. The extra thickness is at the inner side. Hence these fingers have inward projections at the ends. Intermediately of these inward projections the fingers are resilient and normally have a tendency to remain substantially straight. In the under side of the body-piece $d$ of the downhold is a cavity $d^4$. This cavity is well illustrated in Figs. 1 and 2. Its shape may also be understood from Fig. 15, where it is shown in dotted outline. It will be seen from this figure that, like the body-piece, it is of rectangular form, except at one end, where it is rounded. The upper ends of the fingers $d'$ $d^2$ extend upward into the cavity $d^4$ and also into holes $d^5$, which extend from the cavity $d^4$ through the top of the body-piece $d$. These holes, it will be seen, are considerably larger than the upper ends of the fingers $d'$ $d^2$, so that these ends of the fingers may have a slight movement therein in the direction of the length of the body-piece and also in a direction at right angles to the length of the body-piece. The fingers $d'$, it will be seen, are arranged in pairs, so that opposite each of these finger-pieces, which are at one side of the downhold, there will be another on the other side of the downhold. Between the several pairs of the fingers $d'$ plates $d^6$ are interposed in the body-piece $d$. There is one of these plates between each pair of the fingers $d'$ and the next adjacent pair. These plates are of such thickness as to maintain the fingers at the desired distances apart and to maintain the fingers out of contact with the sides of the holes $d^5$.

It will be seen by reference to Fig. 16 that the body-piece is provided with inwardly-turned lips $d^7$ at the bottom of the cavity $d^4$. The plates $d^6$ are made T-shaped, or, in other words, are somewhat shorter at the extreme lower edge than above the same. By reason of this they are enabled to fit snugly to the side walls of the cavity $d^4$ of the body-piece. At the unrounded end of the body-piece notches $d^{11}$ are cut through the lip $d^7$, so as to enable the plates to be inserted.

The fingers $d^2$ occupy radial positions in the rounded end of the cavity $d^4$, as may be readily understood by reference to Fig. 15. Between the upper end of each of these fingers and the next is a triangular spacing and clamping piece $d^8$, and between the upper ends of the adjacent fingers $d'$ $d^2$ are fitted spacing and clamping pieces $d^9$, which have flat sides that bear against the adjacent fingers $d'$, inclined sides which fit against the adjacent fingers $d^2$, and arc-shaped outer surfaces which bear against the rounded portion of the cavity $d^4$ in the body-piece.

The body-piece is provided with means for clamping the fingers $d'$ $d^2$ in place. As here shown, these means consist of screws $d^{10}$, which engage with tapped holes in the un-rounded end of the body-piece and impinge against that one of the plates $d^6$ which is the nearer to its end of the body-piece. By turning these screws they may be made to force all the fingers $d'$ and the plates $d^6$ together, and also to force the foremost fingers $d'$ into tight contact with the clamping-pieces $d^3$, and, moreover, to force all the fingers $d^2$ and their clamping-pieces $d^8$ tightly together.

The fingers $d'$ $d^2$ are to be set differently for use in conjunction with lasts of different dimensions; but as two downholds are provided it is not intended that either downhold shall have its fingers adjusted to adapt it for a left instead of a right last. It will be readily seen that if the clamping-screws $d^{10}$ are turned so as to relax the pressure upon the fingers and their clamping-plates these fingers may be raised or lowered in the body-piece and may be rocked inward or outward to adapt them for operation with any particular last of the kind for which the downhold in which they are incorporated is intended, and that after such adjustment they may be securely clamped in position by properly turning the clamping-screws. The longitudinal adjustment of the fingers may be automatic if the last is placed under them and the screws $d^{10}$ are turned to loosen the fingers sufficiently to permit of their movement by gravity.

The fingers $d^2$ preferably have formed in them slits $d^{12}$, which extend from their lower extremities upward. The advantage of this construction is that the lower ends of these fingers may contract laterally, and hence be capable of being moved inward even after the sides of the several fingers contact with each other. The lower ends of these fingers, as well as the lower ends of the fingers $d'$, it will be remembered, are moved inward by the inward movement of the crimpers F in the operation of turning or crimping the edge portion of the upper over the insole which is placed upon the last. In Fig. 4 this inward movement of the fingers is illustrated.

The fingers $d^3$ are shown as made integral with a body-plate $d^{13}$, which is common to all. These fingers, it will be seen, are intended to co-operate with the heel portion of an insole and last. This plate $d^{13}$ is shown as fastened by screws $d^{14}$ to a block $d^{15}$. From this block extends upwardly a plate $d^{16}$, which is provided with two horizontal slots $d^{17}$. The plate $d^{16}$ fits between two cheeks or jaws $d^{18}$, which extend downwardly from a plate $d^{19}$, which is of such dimensions that it may be inserted into the cavity $d^4$ of the body-piece $d$ of the downhold. Screws $d^{20}$ pass through one of the cheeks or jaws through the slots $d^{17}$ of the plate $d^{16}$ and engage with tapped holes in the other cheek or jaw, so as to be able to secure the plate $d^{16}$ in place. The plate $d^{19}$ will be made of such size that it can pass upward between the lips $d^7$. Hence it is capable of a vertical movement within the cavity $d^4$, and in this respect is unlike the fingers $d'$. The plate $d^{19}$ is fitted between some of the plates $d^6$, which are in rear of the fingers $d'$, and hence it may be clamped and loosened by the action of the screws $d^{10}$. When loosened, it may be raised or lowered to suit a last for which the downhold is to be adjusted. The horizontal slots $d^{17}$ of the plate $d^{16}$ afford provision for moving the fingers $d^3$ bodily toward or away from the fingers $d'$ without moving the plate $d^{19}$ in the same direction. Fingers $d'$ may be removed or added when the fingers $d^3$ are moved in the direction of the length of the body-piece. Hence the downhold may be elongated or shortened. Any number of the plates $d^6$ may be arranged in rear of the plate $d^{19}$ to enable the screws $d^{10}$ to fulfill their function. The fingers $d^3$ may be slitted at their lower extremities in the same manner as the fingers $d^2$. Within this series of fingers a post or pin $d^{40}$ may be arranged.

The body-piece of each downhold has a shank $d^{21}$ connected to it. As here shown, this shank is connected to the body-piece in such manner as that there may be a relative movement between it and the body-piece in the direction of the length of the latter. On the top of the body-piece is a plate $d^{22}$, which extends lengthwise of the latter and has side flanges at its upper portion. The shank $d^{21}$ is provided with a plate-like portion $d^{23}$, which is trough-shaped on the under side to enable it to embrace the plate $d^{22}$, and at the lower extremities its plate-like portion has lips or flanges which fit under the flanges of the plate $d^{22}$. In this way a sort of dovetailed connection is provided between the plate $d^{22}$ and the plate-like portion $d^{23}$ of the shank $d^{21}$. A set-screw $d^{41}$, engaging with a tapped hole in the plate-like portion $d^{23}$ of the shank and impinging upon the top of the plate $d^{22}$ of the body-piece, serves to secure the body-piece and shank in their proper relative positions after adjustment.

The shank of each body-piece fits in a tube $D^3$, and the tube $D^3$ is free to slide vertically within one goose-neck or arm $G'$ or $G^2$. As shown, this tube $D^3$ surrounds the rod $H'$ of the goose-neck or arm to which it belongs, and is longitudinally slotted to enable the corresponding lever $H^2$ to pass through it and engage with the said rod $H'$. The shank of the body-piece may be fastened in this tube $D^3$ by means of a cross-pin $d^{24}$ or otherwise. The tube $D^3$ has affixed to its lower end a collar $d^{25}$, which has flanges at the upper and lower edges, and hence a circumferential groove. The upper flange is shown as removable, and is secured in place by a screw-thread to the body of the collar. A ring $d^{26}$ fits in the groove of the collar $d^{25}$ and is provided with trunnions $d^{27}$, with which are pivotally connected links $d^{28}$. These links $d^{28}$ are also pivotally connected with bell-crank levers $d^{29}$, which are arranged one on each side of the goose-neck or arm and fulcrumed to a pin $d^{30}$, which is supported by the latter. One of the levers $d^{29}$ is extended a considerable distance and provided with a handle $d^{31}$ for oscillating it. As the operator manipulates this handle $d^{31}$ to raise and lower the downhold, the lever which is provided with this handle $d^{31}$ is adjusted into contact with a stop $d^{32}$. When the handle is not intended to be used and when said lever is adjusted into this position, it and its fellow, as well as the links $d^{28}$, will bear such relation to the fulcrum $d^{30}$ as that the downhold will be maintained in an elevated position.

To lower the downhold the handle $d^{31}$ of the lever is pushed upward. The downward motion of the downhold resulting from this movement of the handle is intended to be such that the downhold will adjust the sole portion of the last into a predetermined position regardless of the size of the last, so that the last, whatever its size, shall always occupy the proper relation to the pressing and holding fingers, and also to the crimping-fingers. By supporting the jack or last-holder B through the springs $B^2$, provision is afforded for a downward movement of the last under a force imparted to it by the downhold. It will of course be understood that this downward movement occurs before the rods B' are clamped in position.

When the last used in the machine is a left last, that one of the goose-necks or arms which is provided with a left downhold will be swung into position to enable this downhold to be operated, and when a reverse last is used this goose-neck or arm will be swung out of position and the other will be swung into position, so that its downhold can be used. The swinging movement of the goose-necks or arms is restricted by means of stops $g^2$. It is only necessary that each should swing about a quarter of a rotation. The stops consist of pins rising from the plate $P^3$. The base portions of the goose-necks are provided with radially-extending pins $p^{30}$, which will come into contact with the pins $g^2$.

The pressing and holding fingers E' will now be described in detail. These fingers severally consist of strips of metal bent to form what may be termed "upright portions" $e'$ and "horizontal portions" $e^2$. It is desirable that the upright portions $e'$ should have resilience, and in order to give the upright portions that length which is requisite to provide the desired degree of resilience the strips forming these fingers are bent downwardly at the inner end, as at $e^3$, of the horizontal portions $e^2$, and thence upwardly to form the upright portions $e'$. The downwardly-bent portions of the strips and the lower part of their upright portions $e'$ extend into the annular cavity $p'$. Each finger E' is fulcrumed at the junction of its horizontal portion $e^2$ and downwardly-extending portion $e^3$ in a support $e^4$. The support $e^4$ consists of two plates arranged side by side at a sufficient distance apart to accommodate a finger E'; but they are united by being riveted to a block $e^5$, which may be seen best in Fig. 1, and to a lever $e^6$ which carries said support. The fulcrum of the finger-piece is formed by the bearing which the block $e^5$ affords to the angle formed by the junction of the horizontal portion $e^2$ and the downwardly-extending portion $e^3$ of the finger-piece. The face of the block $e^5$ is angular; but of course it is a more acute angle than that of the adjacent portion of the finger, so as to allow of the rocking of the finger upon it, and its thickness is reduced in such direction that the finger-tip may move toward or away from a last in the machine. Each of the levers $e^6$ which carry the finger-supports $e^4$ is fulcrumed between its ends by a pin $e^7$ in a stand $e^8$, which is affixed to the bed-piece P of the machine adjacent to the cavity $p'$ thereof. Each lever $e^6$ may be oscillated to raise or lower the corresponding finger E' into the proper position to operate upon a last in the machine. The oscillation of the finger-piece upon the fulcrum in its support $e^4$ serves to move the tip of the finger toward or away from the last. The plates comprised in each support $e^4$ serve to guide the upright portion of the corresponding finger and to sustain it against deflection in a plane transverse to the sides of the plates.

It will be seen, especially in Figs. 22 and 23, that the fingers E' have tips $e^9$, which are fastened to their upright portions $e'$. A convenient way of attaching these tips is to provide them at one end with screw-threaded sockets and to form screw-threads upon the extremities of the upright portions $e'$ for engaging with the sockets. The upper extremities of the fingers are inclined slightly inward, and the tips $e^9$, of course, have the same inclination. It is advantageous to form a notch or jog in the upper portion of that side of the finger-pieces which is toward the last.

The band $E^2$ is attached to the inner sides of the finger-tips, and when the finger-tips move inward is pressed against the upper upon the last. It is made preferably of a woven fabric having strips of rubber incorporated into it to render it elastic. Its function is to prevent the finger-tips from marring the upper. A convenient way of attaching the band to the finger-tips is to provide the latter with facing-pieces $e^{50}$ of sheet metal extending over the sides which are toward the last and bent across the upper and lower extremities and a slight distance over the back, and to form in these facing-pieces holes through which the band may be stitched to fasten it to the facing-pieces.

The levers $e^6$ are oscillated by means of vertically-sliding pins $e^{10}$, and the levers forming the pressing and holding fingers E' are oscillated by vertically-sliding pins $e^{11}$. These pins $e^{10}$ $e^{11}$ are not all of the same length. The different pins $e^{10}$ vary in length at different parts of the machine, and this is equally true of the pins $e^{11}$. They work in tubes $e^{12}$, which are erected upon the bed-piece P. In the pins are longitudinal grooves, and into these grooves project pins or set-screws $e^{13}$, Fig. 4, which are inserted transversely in the tubes. These pins or screws $e^{13}$ prevent the pins $e^{10}$ $e^{11}$ from dropping out of the tubes $e^{12}$, but afford facility for removing the pins and inserting others of different lengths, as may be required for different lasts. The upper ends of the tubes $e^{12}$ are notched or bifurcated and the ends of the levers $e^6$ and the levers forming the pressing and holding fingers E' fit in the notched or bifurcated portions of the tubes. When the pins $e^{10}$ are moved upward, the levers $e^6$ are oscillated, so as to lower the pressing and holding fingers to the extent necessary to adjust the tips of the latter to the desired positions. As soon as the pins $e^{10}$ descend or become free to descend springs $e^{14}$ $e^{24}$ oscillate the levers $e^6$ in the reverse direction, and thereby raise the pressing and holding fingers. These springs $e^{14}$ are, as represented, helical in form, and are connected at one end with the upright portions $e'$ of the pressing and holding fingers and at the other end to a rail $e^{15}$, which is supported by standards or posts $e^{16}$, erected on the bed-piece P. The rail $e^{15}$ extends entirely around the series of pressing and holding fingers. The springs $e^{24}$ are connected at one end to the standards $e^8$ and at the other end to the pressing and holding finger supports $e^4$. An upward movement of the pins $e^{11}$ will oscillate the levers forming the pressing and holding finges E' in such direction as that their tips and the band $E^2$ will move toward the last. As soon as the pins $e^{11}$ descend or become free to descend the springs $e^{14}$ will oscillate these levers in the reverse direction and move their tips and the band $E^2$ away from the last.

I will now describe the means whereby the pins $e^{10}$ $e^{11}$ are operated. $E^3$ $E^4$ designate two rings carrying series of pins $e^{17}$ $e^{18}$. These rings may perhaps be best understood by reference to Figs. 1, 2, 5, and 9. They surround the base portion of the machine-frame. The inner ring $E^3$ is held in place by the base portion of the machine-frame. The ring $E^4$ fits around the ring $E^3$ and is held in place by it. The ring $E^3$ is raised periodically by cams $E^5$, affixed to the shaft S'. It will descend by gravity when this cam recedes from it. The ring $E^4$ may be raised and allowed to descend in the same manner by means of cams $E^6$, which are affixed to the shaft S'. When the ring $E^4$ is raised, its pins $e^{18}$ will raise the pins $e^{10}$ and the levers $e^6$ will be oscillated by the latter, so as to lower the levers forming the pressing and holding fingers E'. On a descent of this ring the levers $e^6$ will be oscillated by the springs $e^{14}$ in the reverse direction. When the ring $E^3$ rises, its pins $e^{17}$ will raise the pins $e^{11}$ and oscillate the levers forming the pressing and holding fingers, so that the tips of the latter and the band $E^2$ will be moved toward the last. The descent of the ring $E^3$ will permit the spring $e^{14}$ to reversely oscillate these levers. The pins $e^{17}$ $e^{18}$ are not the same length all round the rings $E^3$ $E^4$, but vary in length because the motions which it is necessary to impart to the levers $e^6$ and to the levers forming the pressing and holding fingers are different to enable these levers to operate at different portions of the last. It will be seen by reference to Figs. 1, 2, and 5 that the ring $E^3$ is composed of two sections $e^{19}$ $e^{20}$. The section $e^{19}$ has at the upper edge an outwardly-extending flange, and below this flange has a screw-thread formed on its exterior surface. The section $e^{20}$ has at the lower edge an inwardly-extending flange, and above this flange has a screw-thread formed on its inner surface to engage with the screw-thread of the section $e^{19}$. Obviously a rotary movement of the section $e^{20}$ in one direction will produce an elevation of the section $e^{19}$, and a reverse rotation thereof will effect the lowering of the section $e^{19}$. Owing to the construction of the ring $E^3$ of two sections provision is afforded for varying the vertical dimensions of the ring. The ring $E^4$ is constructed, precisely like the ring $E^3$, of two sections $e^{21}$ $e^{22}$. The rotary adjustment of the section $e^{22}$ will raise or lower the section $e^{21}$ to vary the vertical extension of this ring. The flange of the section $e^{19}$ of the ring $E^3$ bears against the inner surface of the section $e^{21}$ of the ring $E^4$ and is locked to the latter section so that it can have no rotary movement independently thereof. The locking is effected by introducing a key $e^{23}$ into notches in the said sections $e^{19}$ $e^{21}$ of the rings $E^3$ $E^4$. Outside the ring $E^4$ is a ring F', and outside of the ring F' is a ring $F^2$. The ring F' is composed of two sections $f'$ $f^2$, corresponding with the sections of the rings $E^3$ $E^4$, already described, and the ring $F^2$ is composed of two sections $f^3$ $f^4$ of the same character. The section $e^{21}$ of the ring $E^4$ is locked to the section $f'$ of the ring F' by a key $f^5$, inserted in notches provided in said sections, and the section $f'$ of the ring F' is locked to the section $f^3$ of the ring $F^2$ by means of a key $f^6$, inserted in notches formed in these sections. In brief, the section $e^{19}$ of the ring $E^3$, the section $e^{21}$ of the ring $E^4$, the section $f'$ of the ring F', and the section $f^3$ of the ring $F^2$ are all locked together so as to be incapable of independent rotation. The keys $e^{23}$ $f^5$ $f^6$ are, however, of such length vertically that any one of the sections interlocked thereby may be raised or lowered without being unlocked from the other sections to which the keys are fitted. Each of these keys should be secured by a rivet or otherwise to one of the sections with which it interlocks and be left free to slide only in the other of the sections with which it interlocks. The section $f^4$ of the outermost ring $F^2$ has affixed to it toes $I'$ $I^2$. These toes co-operate with arms or projections $g^4$, which are affixed to or formed with the slits $g'$, with which the base portions of the goose-necks or arms G' $G^2$ are provided, and the coaction is such that when either goose-neck or arm is moved into position for use its arm or projection $g^4$ will come into contact with one of the toes I' $I^2$ and through it impart a slight oscillating movement to the sections $e^{19}$ of the ring $E^3$, $e^{21}$ of the ring $E^4$, $f'$ of the ring $F'$, and $f^3$ of the ring $F^2$. This slight oscillating movement serves to put the machine into condition to operate the pressing and holding fingers and also other parts which will be hereinafter described for operating in connection with that particular kind of a last with which the downhold of the particular goose-neck which at the time is adjusted into position for use is intended. This oscillating motion is enabled to do this because it brings a different set of pins $e^{17}$ $e^{18}$ beneath the pins $e^{11}$ $e^{10}$. There are intended to be two pins $e^{17}$ for each of the pins $e^{11}$, and two pins $e^{18}$ for each of the pins $e^{10}$, and the slight oscillating movement just described is intended to adjust the top sections of the rings, so as to bring a different set of pins $e^{17}$ $e^{18}$ beneath the pins $e^{11}$ $e^{10}$. Certain of the pins $e^{17}$ $e^{18}$ of one set will of course be reversed in respect to height as compared with the corresponding pins of the other set in order to enable one set to operate with the left last and the other with the right last. Instead of having merely two sets of the pins $e^{17}$ $e^{18}$, there may be four sets of these pins. In such case two would be constructed and arranged to operate with a left last and the other two with a right last of the same general character—as, for instance, with a left last and a right last designed for men's shoes—and the other two would be constructed and arranged to operate in connection with a left last and a right last of another kind of shoe—as, for instance, a lady's shoe. As the arms or projections $g^4$ of the goose-necks or arms $G'$ $G^2$ can only move the toes $I'$ $I^2$ far enough to shift one set of pins $e^{17}$ $e^{18}$ out of an operative position and the next set of these pins into an operative position, it follows that in order to organize the machine for operation with the third and fourth set of the pins $e^{17}$ $e^{18}$ it will be necessary to detach the toes $I'$ $I^2$ and reattach them in a different position. To provide for this, I construct the toes $I'$ $I^2$ integral with an arc-shaped plate I, which is fitted to the exterior of the section $f^3$ of the outermost ring $F^2$. Screws $f^7$, extending radially through the plate I and into tapped holes $f^8$ in the section $f^3$ of the ring $F^2$, secure the plate I to the ring. By disengaging these screws from the ring and adjusting the plate into a different position relatively to the ring the screws may be engaged with other tapped holes $f^9$ in the ring and then will secure the plate in such position that the toes $I'$ $I^2$ may, when moved by the arms or projections $g^4$ of the goose-necks or arms $G'$ $G^2$, shift the third and fourth sets of the pins $e^{17}$ $e^{18}$ into operative positions, one set at a time.

I will now describe the manner in which the sections $e^{20}$ $e^{22}$ may be rotated to raise or lower the sections $e^{19}$ $e^{21}$ of the rings $E^3$ $E^4$. In giving this explanation I shall for convenience refer to the corresponding sections of the rings $F'$ $F^2$. The lower sections $e^{20}$ $e^{22}$ $f^2$ $f^4$ of the rings $E^3$ $E^4$ may be rotated independently of the sections $e^{19}$ $e^{21}$ $f'$ $f^3$ of these rings by engaging an arm J with the flange that is at the bottom of whichever section is to be rotated. An arm suitable for this purpose is illustrated in Fig. 11, and, as will be seen, is provided with pins $j'$ $j^2$. The under side of the flanges of the lower sections of the rings is provided at intervals with pairs of holes $j^3$ $j^4$, suitably arranged to receive the pins $j'$ $j^2$ of the arm J. This feature of the construction of the lower sections of the rings may be best understood by reference to Fig. 10, which, as has already been stated, is an inverted plan. The arm J is capable of engaging with the lower section of but one of the rings at a time; but power may be applied to the arm after its engagement to rotate another of these sections. Preferably these flanges of the lower sections of the rings will be provided with graduations that will facilitate their rotary adjustment with reference to a vertical index-mark made on the base portion of the machine-frame. These graduations are represented in Fig. 10, and the mark in Figs. 5 and 10 being marked $k$. By adjusting the lower sections of the rings rotarily with reference to the graduations the other sections of the rings may be elevated or lowered to change the machine for lasts of different sizes. The rings $F'$ $F^2$ are raised and lowered by cams $F^3$ $F^4$, affixed to the shaft $S'$. Between the cams $E^5$ $E^6$ $F^3$ $F^4$ and the rings $E^3$ $E^4$ $F'$ $F^2$ are wearing pieces W, which, as may be seen from Figs. 5 and 12, are curved to be concentric with the said rings, and, as may be seen in Fig. 5, consist of plates $w$, extending horizontally beneath the rings, and downwardly-extending arms $w'$, working in guides $w^2$, which are affixed to the base portion of the machine-frame.

The crimping-fingers F and their appurtenances will now be described in detail. These fingers are supported by bell-crank levers $F^5$, which are fulcrumed by pins $f^{10}$ to the standards $e^8$. The fingers F are not directly connected to these bell-crank levers, but are fitted to blocks $f^{11}$, which are pivotally connected by pins $f^{12}$ to the extremities of the upright arms of the levers. The horizontal or lateral arms of the levers extend into the bifurcate upper ends of tubes $f^{13}$, which are fastened to the bed-piece P, and are fitted with pins $f^{14}$. These pins $f^{14}$ are longitudinally grooved to receive the ends of pins or screws $f^{15}$, which are inserted transversely in the tubes $f^{13}$. When the pins $f^{14}$ move upward, the levers $F^5$ will be oscillated so as to carry the crimping-fingers F longitudinally inward to work over the last. Owing to the pivotal connection of the blocks $f^{11}$ with these levers $F^5$, the levers do not necessarily oscillate the crimping-fingers while imparting longitudinal movement to them. As soon as the pins $f^{14}$ descend or are permitted to descend springs $f^{16}$ oscillate the levers $F^5$ in such direction as to move the crimping-fingers longitudinally away from the last. These springs $f^{16}$ are connected at one end with the rail $e^{15}$ and at the other end with nuts $f^{17}$, that are engaged with screw-threads on the crimping-fingers. The advantage of connecting the springs with the nuts is that provision is thereby afforded for varying the force with which the springs will act upon the fingers. The crimping-fingers are not screw-threaded only at that part where the nuts $f^{17}$ engage with them, but are screw-threaded from the outer ends nearly to the inner ends, and are engaged by the screw-threads with female screw-threads that are formed in the supporting-blocks $f^{11}$. This feature of construction renders it possible to adjust the crimping-fingers longitudinally in the supporting-blocks $f^{11}$, and hence relatively to the levers $F^5$. The pins $f^{14}$ vary in length at different parts of the machine, because different movements of the levers $F^5$ will be required to cause the different crimping-fingers to fulfill their function. The screws $f^{15}$ afford provision for readily removing the pins $f^{14}$ to enable others to be substituted therefor, in order that the machine may be changed for some special last. The pins $f^{14}$ are moved upwardly by means of pins $f^{18}$, that are inserted in the upper section $f'$ of the ring $F'$. There will be a number of sets of the pins $f^{18}$. In the present instance provision is made for four sets of these pins, and these sets bear the same relation to each other and are for the same purpose as the four sets of pins $e^{17}$—namely, to provide for adjusting the machine to a right and left last of one kind—such, for instance, as a last for a man's shoe—and to provide for adjusting the machine to a right and left last of another kind—such, for instance, as a last for a lady's shoe.

I have already explained that the crimping-fingers are not merely capable of a movement toward and away from the last, but are also capable of oscillating so that their inner ends may be adjusted to different vertical positions. This oscillating movement is provided for by the pivotal connection of their supporting-blocks $f^{11}$ with the levers $F^5$, and is produced in one direction by pins $f^{19}$ and in the other direction by the springs $f^{16}$. The pins $f^{19}$ are arranged in tubes $f^{20}$, which are inserted in the bed-piece P. The tubes $f^{20}$ are made internally larger at the upper end than at the lower end to accommodate heads with which the upper ends of the pins $f^{19}$ are provided. These heads will prevent the pins $f^{19}$ from dropping out of the tubes, but do not interfere with the removal of the pins in an upward direction in the event of its becoming desirable to substitute others for them. As it is undesirable to make the tubes $f^{20}$ and the pins $f^{19}$ project upwardly far enough to reach the crimping-fingers themselves, I have attached to the outer ends of the crimping-fingers rods $f^{21}$, which descend into the tubes $f^{20}$ and rest upon the heads of the pins $f^{19}$.

The particular means which I have represented for connecting the rods $f^{21}$ to the crimping-fingers comprise blocks $f^{22}$, screwed onto the outer ends of the crimping-fingers and receiving through their outer extremities the rods $f^{21}$. Nuts $f^{23}$ $f^{24}$, applied to a screw-thread formed upon the rods $f^{21}$ and arranged to bear above and below the blocks $f^{22}$ of the crimping-fingers, fasten the rods to these blocks. The nuts are not made to clamp the rods to the blocks, but are adjusted so as to make a loose connection between the rods and the blocks, whereby the rods become capable of an oscillating movement relatively to the crimping-fingers. An advantage resulting from this particular mode of connecting the rods $f^{21}$ with the crimping-fingers arises from the provision afforded for adjusting the rods longitudinally with reference to the crimping-fingers. The pins $f^{19}$ are moved upward by pins $f^{30}$, attached to the upper section of the ring $F^2$.

Thus far I have only described those features which are common to all the crimping-fingers and their appurtenances. In those crimping-fingers which operate upon the heel and toe portions of a last there are some additional features requiring description. This description I will now undertake, with particular reference to Figs. 1 and 6. The blocks $f^{11}$ of those crimping-fingers F which operate at the heel and toe portions of the last are not connected directly to the crimping-fingers, but are provided in their upper sides with grooves which are curved to facilitate the swinging of these crimping-fingers about the axes of the pins $f^{21}$. Of course the curves cannot always be concentric with the pins $f^{21}$, because of the provision for the longitudinal adjustment of the crimping-fingers relatively to the blocks $f^{11}$. The varying projection of the different crimping-fingers beyond the blocks $f^{11}$ will also preclude the making of the grooves concentric with the pins $f^{21}$, unless the blocks should be made especially for the different crimping-fingers. As the pins $f^{21}$ fit so loosely in the tubes $f^{20}$ as to be able to oscillate toward and from the last, it is, moreover, unnecessary that the grooves of the blocks $f^{11}$ should be curved concentrically with the pins $f^{21}$. With the grooves of these blocks $f^{11}$ engage nuts $f^{34}$, which receive the particular crimping-fingers F, which are now under consideration—namely, those operating at the heel and toe portions of the last. These nuts are provided with tongues entering the grooves, and the tongues and grooves are preferably of a dovetailed construction to prevent the nuts from being lifted off the blocks $f^{11}$. Set-screws $f^{25}$, engaging with tapped holes in the nuts $f^{24}$ and impinging against the blocks $f^{11}$, serve to preserve the relations of the nuts to the blocks after adjustment. Obviously the grooved blocks combined with the nuts $f^{24}$ afford provision for swinging the crimping-fingers to operate on the heel and toe portions of the last laterally. The object of this provision is to enable one or more of these crimping-fingers to be entirely removed and then to adjust the remaining ones so as to be equidistant. Preferably these crimping-fingers which operate in conjunction with the heel and toe portions of a last will be slitted at their operating extremities. I mean by this that they will be constructed in some way so as to be at these points divided into a number of narrow pieces. The material of the pieces between the slits is to be resilient, so that they may be forced together to reduce the width of the operating extremities of the crimping-fingers, and thereby enable the fingers to be moved inward even after the sides of their operating extremities shall have come into contact. It may be advantageous not to form vertical slits in the operating extremities of the crimping-fingers, but to form in them slits which will be oblique to a vertical plane. They may, instead of being straight slits, be arc-shaped or curved between the upper and lower surfaces of the crimping-fingers.

On the shaft $S'$ a bevel gear-wheel $S^2$ is affixed, and this engages with a bevel-pinion $S^3$, which is affixed to a shaft $S^4$. This shaft $S^4$ transmits motion to the shaft $S'$ and receives motion from the driving-shaft $S^5$ of the machine. The shafts $S'$ $S^4$ $S^5$ are journaled in the base portion of the machine. The shafts $S^4$ $S^5$ are geared together by means of a gear-wheel $S^6$, arranged on the shaft $S^4$, and a pinion $S^7$, affixed to the shaft $S^5$. The gear-wheel $S^6$ is loosely mounted on the shaft $S^4$. These parts are best illustrated by Figs. 1, 5, 6, 9, 12, 28, and 29.

On the shaft $S^4$ is secured a piece $S^8$, having three arms $s'$ $s^2$ $s^3$. (See particularly Fig. 13.) These arms are not permanently connected with the wheel $S^6$, but may be connected therewith at any time by means of a pin $s$, which is carried by said arms and passes through one of them at such a distance from the center of the shaft $S^4$ as to be capable of entering one of a number of holes $s^4$ with which the wheel $S^6$ is provided. It will be seen, therefore, that the piece $S^8$ may be locked in different positions to the wheel $S^6$. The advantage of having a number of holes $s^4$ in the wheel $S^6$ is that the piece $S^8$ may be engaged with the wheel after turning but a fraction of a revolution, instead of having always to turn round to one part of the wheel before engagement therewith. Preferably the holes $s^4$ are lined with steel bushing.

To the arms $s^2$ $s^3$ of the piece $S^8$ springs $S^9$ $S^{10}$ are at one end secured in any suitable manner—as, for instance, by screws $s^5$. The other ends of the springs $S^9$ $S^{10}$ are connected to the pin $s$, and the function of these springs is to force this pin into engagement with the wheel $S^6$. The pin $s$ has an extended head or flange $s^6$. The lever $S^{11}$, which is fulcrumed on the base portion of the machine, will normally occupy such position as that the head or flange $s^6$ of the pin $s$ will overlap it. This lever, it will be seen, is curved for a distance to be approximately concentric to the shaft $S^4$, and the portion so curved is provided with a forwardly-extending incline $s^7$. Whenever the rotation of the piece $S^8$ will bring the head or flange $s^6$ of the pin $s$ into proximity to the curved portion of the lever $S^{11}$, this head or flange will ride along the incline $s^7$, and the latter will effect the disengagement of the pin $s$ from the wheel $S^6$. As soon as the pin $s$ is thus disengaged from the wheel $S^6$ the latter will cease to impart movement to the piece $S^8$, and consequently to the shaft $S^4$. Consequently the operation of the machine will cease, although the driving-shaft $S^5$ continues rotating.

In order to prevent the piece $S^8$ from moving backward after the disengagement of its pin $s$ from the wheel $S^6$, I preferably combine with the lever $S^{11}$ a detent $S^{12}$ for engaging with the arm $s'$ of said piece $S^8$. I have shown this detent as consisting of a strip of spring metal attached to the lever and constructed to hook over the end of the arm $s'$. The construction of this detent may be best understood by reference to Fig. 13. To arrest the continued movement of the piece $S^8$, I preferably provide the lever $S^{11}$ with a projection $s^{19}$, with which the outer extremity of the arm $s'$ of said piece $S^8$ will contact whenever the lever $S^{11}$ is moved inward.

The lever $S^{11}$ will preferably be so fulcrumed as that it will normally be in position to effect the disengagement of the pin $s$ of the piece $S^8$ from the wheel $S^6$. I have shown the lever as provided with a screw-threaded lower end $s^8$, which is passed through a bracket $s^9$, (see Figs. 1 and 13,) that is fastened to the base portion of the machine-frame. The hole in this bracket through which the end $s^8$ of the lever passes is made flaring from the center toward each end to enable the lever to rock in it toward and from the shaft $S^4$. Above the bracket is a ring or washer of soft rubber $s^{10}$, and there is a similar ring below the bracket. Washers are applied to the top of the ring $s^{10}$ and bottom of the ring $s^{11}$. Nuts $s^{12}$ are applied to the screw-threaded end $s^8$ of the lever to bear against these washers. It is intended that the nuts shall hold the rings $s^{10}$ $s^{11}$ closely against the bracket $s^9$. As the lever cannot be oscillated without compressing some portions of the rings $s^{10}$ $s^{11}$, these rings constitute springs which tend to maintain the lever with its end $s^8$ in an upright position. When its end occupies an upright position, the lever is operated to disengage the pin $s$ from the wheel $S^6$ and cause the hook of the detent $S^{12}$ and the projection $s^{19}$ of the lever $S^{11}$ to engage with the outer extremity of the arm $s'$ of the piece $S^8$. When the arm $s'$ contacts with the projection $s^{19}$, the rings $s^{10}$ $s^{11}$ will yield and prevent any violent shock.

It is intended that the operator shall continually hold the lever $S^{11}$ in a position which will prevent it from operating upon the pin $s'$. The shaft $S^4$ will make several rotations during the operation of the machine for a single lasting. At the termination of the operation of lasting he allows the lever to oscillate into its normal position, so that it will effect the disengagement of the pin $s$ from the wheel $S^6$, and he may do this at any time if it is desired to sooner terminate the operation of the machine.

On the driving-shaft $S^5$ is a fly-wheel $S^{13}$. A belt-pulley $S^{14}$ is formed integral with or affixed to this fly-wheel. $S^{15}$ is a ring which surrounds the shaft $S^5$ and is fastened by screws or otherwise to the hub on the fly-wheel $S^{13}$ and driving-pulley $S^{14}$. $S^{16}$ is another ring surrounding the shaft $S^5$. It is connected to the shaft to rotate therewith by means of a key $s^{13}$; but it is free to move longitudinally toward and away from the plate $S^{15}$. A spring $S^{17}$ surrounds the shaft $S^5$ between the plate $S^{16}$, and a nut $s^{14}$ forces and holds the plate $S^{16}$ against the plates $S^{15}$, but allows said plate $S^{16}$ to move in the reverse direction when necessary. The tension of the spring $S^{17}$ may be varied by adjusting the nut $s^{14}$ and a nut $s^{15}$ upon a screw-thread which is formed upon the outer end portion of the shaft $S^5$.

The fly-wheel $S^{13}$ and driving-pulley $S^{14}$ are not intended to have any movement in the direction of the length of the shaft $S^5$, and, as here shown, are prevented from moving away from the outer end of the shaft by having their hubs bear against the hub of the gear-wheel of the pinion $S^7$. A rotary motion will be transmitted from the driving-pulley through the plate $S^{15}$ to the plate $S^{16}$ and thence to the shaft $S^5$. Owing to the yielding connection of the plate $S^{16}$ with the shaft $S^5$, this plate can move toward the outer end of the shaft sufficiently to allow the driving-pulley $S^{14}$ to rotate without imparting any rotary movement to the shaft $S^5$ in the event of the machine becoming blocked or stopped. Thus I provide for obviating breakage which might otherwise ensue upon the blocking or accidental stopping of the machine. Preferably the opposite faces of the plates $S^{15}$ $S^{16}$ are serrated or toothed. When this is done, the teeth will have a trough-shaped cross-section.

The mechanism whereby motion is transmitted to the various parts of the machine and the stop mechanism for arresting the movements of said parts are peculiarly advantageous to my lasting-machine, but are also applicable, generally, to other machines.

The base portion of the machine may, if desired, be provided with one or more doors to give ready access to its interior.

In this application I have shown and described certain clutch mechanism; but I do not claim it herein, as the same is shown, described, and claimed in my application filed February 25, 1891, Serial No. 382,752.

What I claim as my invention, and desire to secure by Letters Patent, is—

1. In a lasting-machine, the combination of a holder or jack for a last, a yielding support for said holder or jack and from which the holder or jack is detachable, and a downhold whereby the last and its holder or jack will be lowered to the proper position and an insole held on the last, substantially as specified.

2. In a lasting-machine, the combination of a holder or jack for a last, a support in which the holder or jack is loosely seated, consisting of two independently-yielding rods $B'$, springs solely sustaining the rods, and clamps for securing the rods in an adjusted position, substantially as specified.

3. In a lasting-machine, the combination, with a bed-plate in the machine, of a holder or jack for the last, a yielding support for the holder or jack fitted to said bed-plate, a downhold having a predetermined movement and serving to insure the proper position for the last, a plate $p^2$, extending from the bed-plate, a plate $p^3$, movable toward and from the plate $p^2$, a screw for imparting movement to the plate $p^3$, and mechanism, substantially such as described, for operating said screw to cause the plate $p^3$, in connection with the plate $p^2$, to clamp the said yielding support for the holder or jack, substantially as specified.

4. In a lasting-machine, the combination, with a bed-plate in the machine, of a holder or jack for the last, a yielding support for the holder or jack fitted to said bed-plate, a downhold having a predetermined movement and serving to insure the proper position for the last, a plate $p^2$, extending from the bed-plate, a plate $p^3$, movable toward and from the plate $p^2$, a screw for imparting movement to the plate $p^3$, a frame $b^6$ $b^7$, fastened to said screw, and a cam $B^3$ for operating the said frame, substantially as specified.

5. In a lasting-machine, the combination of a holder or jack for a last, a stretcher for drawing the upper tightly around the last, an arm extending over the stretcher, and rods depending from said arm and having at the lower portions cross-pieces $c^7$ $c^8$, with which the part $c^2$ of the stretcher provided with a hook $c^{10}$ and lugs $c^9$ may engage, substantially as specified.

6. In a lasting-machine, the combination of a holder or jack for a last, a stretcher for drawing the upper tightly around the last, an arm extending over the stretcher, rods having a sliding movement in said arm and serving to move the stretcher away from the holder or jack, a rack-bar connected with said sliding rods, a lever having a toothed segment at one end, whereby it engages with the rack-bar, and a cam for operating said lever, substantially as specified.

7. In a lasting-machine, the combination of a holder or jack for a last, a stretcher for drawing the upper tightly around the last, standards or supports erected upon the machine-frame below the stretcher for sustaining the stretcher prior to its operation, rods constructed to engage the stretcher and extending above the stretcher, and an arm or support extending above the stretcher and with which said rods have a sliding connection, substantially as specified.

8. In a lasting-machine, the combination of a holder or jack for a last, an arm extending over the same, a stretcher for drawing the upper tightly around the last, a rack-bar for moving said stretcher, a lever having a segmental toothed end engaging with said rack-bar, a longitudinally-slotted tubular rod surrounding the rack-bar and receiving the end of said lever through it, and a downhold moved by said slotted tubular rod, substantially as specified.

9. In a lasting-machine, the combination of a rubbing stretcher comprising a frame and an envelope depending therefrom and horizontally puckered at the sides from the toe portion rearward, substantially as specified.

10. In a lasting-machine, the combination, with a rubbing stretcher comprising a frame and an envelope depending therefrom and puckered at the sides from the toe portion rearward, of springs connecting the puckered portion of the envelope with the frame, substantially as specified.

11. In a lasting-machine, the combination, with a rubbing stretcher comprising a frame and an envelope depending therefrom and puckered at the sides from the toe portion rearward, of springs connecting the puckered portion of the envelope with the frame, and a plate bearing against the side portions of the envelope below the puckered part thereof, substantially as specified.

12. In a lasting-machine, the combination of a stretcher composed of two sections severally having frames and envelopes depending therefrom, the frame of the inner section and supports for the frame of the inner section, whereby it will on the movement of the outer section be moved away from the last at the toe portion before being at any other portion moved in such direction, substantially as specified.

13. In a lasting-machine, the combination of a stretcher composed of two sections severally having frames and envelopes depending therefrom, the frame of the inner section being inclined with reference to that of the outer section, so as to diverge from the frame of the outer section toward the heel portion, substantially as specified.

14. In a lasting-machine, the combination of a holder or jack for a last, an arm extending over the same, a sliding rod supported by said arm, a downhold attached to said sliding rod, a lever $d^{29}$, fulcrumed to said arm, and links $d^{28}$, connecting said lever with said sliding rod, substantially as specified.

15. In a lasting-machine, the combination of a holder or jack for a last, an arm extending over the same, a sliding rod supported by said arm, a downhold attached to said sliding rod, a lever $d^{29}$, fulcrumed to said arm, links $d^{28}$, connecting said lever with said sliding rod, and a stop $d^{32}$ for limiting the motion of said lever, substantially as specified.

16. In a lasting-machine, the combination of a holder or jack for a last, a rod movable toward and from the said holder or jack, and a downhold having a shank which is connected to said rod by means of sliding plates $d^{22}$ $d^{23}$ and a locking device, substantially as specified.

17. A downhold for a last in a lasting-machine, having inwardly-yielding sides composed of a number of independent fingers adjustable longitudinally and inward and outward, a body-piece in which said fingers are adjustable, and clamping-screws for securing the fingers in their several adjusted positions, the said fingers being flexible at the portion where they act upon the last, so that they may be bent inward, substantially as specified.

18. In a downhold for a last in a lasting-machine, a body-piece, a number of fingers independently adjustable longitudinally in the body-piece, and means for securing said fingers fixedly after adjustment, substantially as specified.

19. A downhold for a last in a lasting-machine, having a number of yielding fingers isolated from one another, and a body-piece in which said fingers are adjustable longitudinally and inward and outward, substantially as specified.

20. A downhold for a last in a lasting-machine, having a number of fingers slitted or divided at the lower extremities and constructed so as to yield toward the center and in the direction of the circumference of a last, substantially as specified.

21. A downhold for a last in a lasting-machine, having a body-piece provided with a cavity, a number of holes above said cavity, a number of depending fingers arranged to conform to a last, having shanks which are fitted within said cavity and pass up through said holes, a number of clamping-pieces between the shanks of said fingers, and devices for forcing the shanks of the fingers and the clamping-pieces together, substantially as specified.

22. A downhold for a last in a lasting-machine, having a body-piece $d$, provided with a cavity $d^4$, a number of holes $d^5$ above said cavity, a number of fingers $d'$, having shanks which are fitted within said cavity and pass up through said holes, a number of clamping-pieces between the shanks of said fingers, and devices for forcing the shanks of the fingers and the clamping-pieces together, substantially as specified.

23. A downhold for a last in a lasting-machine, having a body-piece $d$, provided with a cavity $d^4$, lips $d^7$ below said cavity, a number of holes $d^5$ above said cavity, a number of fingers $d'$, having shanks which are fitted within said cavity and pass up through said holes, a number of clamping-pieces $d^6$ between the shanks of said fingers, and devices for forcing the shanks of the fingers and the clamping-pieces together, substantially as specified.

24. A downhold for a last in a lasting-machine, having a body-piece $d$, provided with a cavity $d^4$, rounded at one end, a number of holes $d^5$ above said cavity, a number of fingers $d'$ $d^2$, having shanks which are fitted within said cavity, a number of triangular spacing and clamping pieces between the shanks of the fingers $d^2$, a number of clamping-pieces between the shanks of the fingers $d'$, and devices for forcing the shanks of the fingers and the clamping-pieces together, substantially as specified.

25. A downhold for a last in a lasting-machine, having a body-piece and a number of fingers independently connected thereto, and a number of fingers $d^3$, connected to a common support which is fastened to said body-piece, substantially as specified.

26. A downhold for a last in a lasting-machine, having a body-piece, a number of fingers, a number of clamping-pieces intermediate of the fingers and securing the fingers independently to the body-piece, a number of fingers $d^3$, a plate $d^{16}$, connected with these fingers $d^3$, and another plate which is clamped in said body-piece, one of these two plates being slotted approximately parallel with the length of the body-piece and the other being provided with pins engaging said slots to enable the fingers $d^3$ to be adjusted bodily toward and from the fingers first mentioned, substantially as specified.

27. In a lasting-machine, the combination of pressing and holding fingers for acting in conjunction with the side portions of a last, and a band of flexible material attached to and extending from one to another of said fingers continuously around the circumference of a last only, substantially as specified.

28. In a lasting-machine, the combination of pressing and holding fingers for acting in conjunction with the side portions of a last, perforated facing-pieces for the operative ends of said fingers, and a band of flexible material connected to said fingers by being stitched through the perforations of the facing-pieces and extending continuously around the circumference only of a last, substantially as specified.

29. In a lasting-machine, the combination of pressing and holding fingers for acting in conjunction with the side portions of a last, tips $e^9$ for said fingers, perforated sheet-metal facing-pieces $e^{50}$, secured to said tips, and a band fastened by stitching to said facing-pieces, substantially as specified.

30. In a lasting-machine, the combination of resilient pressing and holding fingers acting in conjunction with the side portions of a last, and rotarily adjustable plates having sets of pins to provide for adjustments to enable them to operate the fingers suitably for different lasts, substantially as specified.

31. In a lasting-machine, the combination of pressing and holding fingers acting in conjunction with the side portions of a last and supported by fulcra having horizontal axes, plates provided with pins for operating said fingers, and mechanism, substantially such as described, for raising and lowering said plates, substantially as specified.

32. In a lasting-machine, the combination of pressing and holding fingers acting in conjunction with the side portions of a last and made in the form of levers supported by fulcra having horizontal axes, plates provided with pins for oscillating said levers, and mechanism, substantially such as described, for raising and lowering said plates, substantially as specified.

33. In a lasting-machine, the combination of pressing and holding fingers acting in conjunction with the side portions of a last, plates made in the shape of rings and provided with several sets of pins for operating said fingers, and mechanism, substantially such as described, for raising and lowering said plates, said ring-shaped plates being rotarily adjustable to present different pins to operate upon the fingers in order to adapt the machine for different lasts, substantially as specified.

34. In a lasting-machine, the combination of pressing and holding fingers acting in conjunction with the side portions of a last and made in the form of levers, so as to have upright and horizontal portions, pins $e^{11}$ for imparting movement to said levers, tubes $e^{12}$, within which these pins move, and having notched or bifurcated ends receiving the ends of the levers, pins $e^{17}$ for operating the pins $e^{11}$, plates carrying the pins $e^{17}$, and mechanism, substantially such as described, for moving these plates, substantially as specified.

35. In a lasting-machine, the combination of pressing and holding fingers acting in conjunction with the side portions of a last and made in the form of levers, so as to have upright and horizontal portions, pins $e^{11}$ for imparting movement to said levers, tubes $e^{12}$, within which these pins move, and having notched or bifurcated ends receiving the ends of the levers, pins $e^{17}$ for operating the pins $e^{11}$, ring-shaped plates carrying the pins $e^{17}$, and mechanism, substantially such as described, for moving these plates, said ring-shaped plates being adjustable to present different pins $e^{17}$ for operating the pins $e^{11}$, substantially as specified.

36. In a lasting-machine, the combination of a number of pressing and holding fingers for acting in conjunction with a last and made in the form of levers, sustaining-fulcra having horizontal axes, a number of supports for these fulcra, levers sustaining said supports, and rising-and-falling plates for operating said two sets of levers, substantially as specified.

37. In a lasting-machine, the combination of a number of pressing and holding fingers for acting in conjunction with a last, a number of supports for these fingers, pins for moving said fingers, other pins for moving the supports of said fingers, a plate provided with pins for actuating the pins whereby the fingers are operated, another plate provided with pins for actuating the pins whereby the supports of the fingers are adjusted, and mechanism, substantially such as described, for operating these plates, substantially as specified.

38. In a lasting-machine, the combination of pressing and holding fingers for acting in conjunction with a last, a number of supports for these fingers, pins for moving said fingers, other pins for moving the supports of said fingers, a plate having several sets of pins and made adjustable to present different pins opposite the pins which operate the fingers, another plate having several sets of pins and made adjustable to present different pins opposite the pins which operate the finger-supports, and mechanism, substantially such as described, for moving these plates to cause the operation of the fingers, substantially as specified.

39. In a lasting-machine, pressing and holding fingers composed of portions $e'$ $e^2$ $e^3$, substantially as specified.

40. In a lasting-machine, the combination of pressing and holding fingers composed of portions $e'$ $e^2$ $e^3$ and supports $e^4$, consisting of pairs of plates, between which said fingers are fulcrumed, and which are extended to stay the portions $e'$ of said fingers laterally, substantially as specified.

41. In a lasting-machine, the combination of pressing and holding fingers and springs $e^{14}$, connected with the upper parts of said fingers and extending outwardly therefrom horizontally, substantially as specified.

42. In a lasting-machine, the combination of pressing and holding fingers, supports for said fingers, levers $e^6$, carrying said supports, and springs $e^{24}$, extending upwardly from said supports, substantially as specified.

43. In a lasting-machine, the combination of pressing and holding fingers made in the form of levers having upright portions and horizontal portions, supports $e^4$ for said fingers, levers $e^6$, carrying said supports, and springs $e^{26}$, acting between the levers $e^6$ and the levers forming the fingers, substantially as specified.

44. In a lasting-machine, the combination of pressing and holding fingers for operating in conjunction with the sides of a last, crimping-fingers made in the form of levers, and bell-crank levers serving to support the last, said levers having the fingers fulcrumed to them, substantially as specified.

45. In a lasting-machine, the combination of crimping-fingers made in the form of levers, and bell-crank levers forming supports for the crimping-fingers and having the latter fulcrumed to them, substantially as specified.

46. In a lasting-machine, the combination of crimping-fingers F, made in the form of levers, blocks $f^{11}$, in which said fingers are adjustable longitudinally, and levers $F^5$, with which said blocks $f^{11}$ are pivotally connected, substantially as specified.

47. In a lasting-machine, the combination of crimping-fingers F, made in the form of levers, blocks $f^{11}$, in which said fingers are adjustable longitudinally, levers $F^5$, with which said blocks $f^{11}$ are pivotally connected, and mechanism, substantially such as described, for oscillating the fingers F and levers $F^5$, substantially as specified.

48. In a lasting-machine, the combination of crimping-fingers, pins for imparting movement thereto, a plate provided with pins for moving the pins first mentioned, and mechanism, substantially such as described, for operating said plate, substantially as specified.

49. In a lasting-machine, the combination of crimping-fingers, pins for imparting movement thereto, a plate provided with several sets of pins for moving the pins first mentioned, and mechanism, substantially such as described, for operating said plate, the said plate being adjustable to present different sets of these pins for operating upon the pins whereby movement is imparted to the fingers, substantially as specified.

50. In a lasting-machine, the combination of crimping-fingers, pins for operating these crimping-fingers, a movable plate provided with pins for imparting movement to the pins of the crimping-fingers, levers to which the fingers are fulcrumed, pins for operating these levers, a movable plate provided with pins for actuating the pins of the supporting-levers, and mechanism, substantially such as described, for imparting movement to the plates, substantially as specified.

51. In a lasting-machine, the combination of crimping-fingers, pins for operating these crimping-fingers, an adjustable plate provided with pins for imparting movement to the pins of the crimping-fingers, levers to which the fingers are fulcrumed, pins for operating these levers, an adjustable plate provided with pins for actuating the pins of the supporting-levers, and mechanism, substantially such as described, for imparting movement to the plates, the said plates being made adjustable to present different pins opposite to the pins to which they impart motion, substantially as specified.

52. In a lasting-machine, the combination of the crimping-fingers F, the supporting-levers $F^5$, and the springs $f^{16}$, extending downwardly from the outer portions of the crimping-fingers, substantially as specified.

53. In a lasting-machine, the combination of crimping-fingers for operating around the sole portion of a last, and supports for the same which are movable toward and from the last, the fulcrum-pieces of those crimping-fingers which are adjacent to the heel or toe portions of the last having provision for lateral adjustment relatively to their supports, substantially as specified.

54. In a lasting-machine, the combination of crimping-fingers F, fitted to blocks $f^{11}$, having curved grooves, and nuts $f^{34}$, adjustably connected with said crimping-fingers and engaging with said grooves, substantially as specified.

55. In a lasting-machine, the combination of crimping-fingers F, fitted to blocks $f^{11}$, having curved grooves, nuts $f^{34}$, adjustably connected with said crimping-fingers and engaging with said grooves, and a screw $f^{35}$ for fastening the nuts in position relatively to the blocks, substantially as specified.

56. In a lasting-machine, crimping-fingers F, having oblique split or slitted ends, the said fingers being adjustable circumferentially and diametrically of a last, substantially as specified.

57. In a lasting-machine, the combination, with a holder or jack for a last, of pressing and holding fingers and crimping-fingers actuated by rising-and-falling plates provided with pins, substantially as specified.

58. In a lasting-machine, the combination, with a holder or jack for a last, of pressing and holding fingers and crimping-fingers made in the form of levers rocking toward and from a last and actuated by plates provided with pins, substantially as specified.

59. In a lasting-machine, the combination, with a holder or jack for a last, of pressing and holding fingers and crimping-fingers actuated by ring-shaped plates having several sets of pins, each set constructed to produce movements suitable for a special last, substantially as specified.

60. In a lasting-machine, the combination, with a holder or jack for a last, of pressing and holding fingers and crimping-fingers actuated by ring-shaped plates having several sets of pins, each set constructed to produce movements suitable for a special last, and a cylindric portion of the machine-frame around which these ring-shaped plates are arranged, substantially as specified.

61. In a lasting-machine, the combination of fingers, a ring-shaped plate provided with pins and composed of two sections engaged by means of screw-threads, so that one may be adjustable relatively to the other, and cams for imparting movement to these ring-shaped plates, substantially as specified.

62. In a lasting-machine, the combination of a number of pressing and holding fingers, a number of crimping-fingers, and a number of rings provided with pins for operating the pressing and holding fingers and the crimping-fingers, and composed, severally, of two sections, the upper sections being interlocked and the lower sections being independently adjustable to adjust the upper sections vertically and independently of each other, substantially as specified.

63. In a lasting-machine, the combination of a number of fingers, a ring-shaped plate provided with a series of pins for imparting movement to said fingers, downholds, swinging arms for supporting the downholds, and connections between the swinging arms and ring-shaped plate, serving to adjust the ring-shaped plate into different positions as said arms are independently adjustable into a position, rendering their downholds operative, substantially as specified.

64. In a lasting-machine, the combination of a number of fingers, a ring-shaped plate provided with a series of pins for imparting movement to said fingers, toes $I'\ I^2$, downholds, and swinging arms for supporting the downholds and provided with projections $g^4$, substantially as specified.

65. In a lasting-machine, the combination of a number of fingers, ring-shaped plates provided with pins for actuating said fingers, cams for imparting movement to said ring-shaped plates, and wearing-pieces W intermediate of said plates and cams and working in guides $w^2$, attached to the machine-frame, substantially as specified.

Signed at New York, in the county of New York and State of New York, this 25th day of June, A. D. 1890.

JOHN PATTEN.

Witnesses:
S. O. EDMONDS,
E. PHILLIPS.